US012547623B1

(12) United States Patent
Banerjee et al.

(10) Patent No.: US 12,547,623 B1
(45) Date of Patent: Feb. 10, 2026

(54) FEEDBACK-BASED MULTIMODAL FRAGMENT RETRIEVAL SYSTEM

(71) Applicant: Amazon Technologies, Inc., Seattle, WA (US)

(72) Inventors: Pratyay Banerjee, San Jose, CA (US); Ojas Yashwant Joshi, Redwood City, CA (US); Shivashankar Subramanian, Point Cook (AU); Ankit Chadha, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 18/899,251

(22) Filed: Sep. 27, 2024

(51) Int. Cl.
*G06F 16/2453* (2019.01)

(52) U.S. Cl.
CPC .............. *G06F 16/24542* (2019.01)

(58) Field of Classification Search
CPC .............................. G06F 16/24542
See application file for complete search history.

(56) References Cited

U.S. PATENT DOCUMENTS

| 12,332,949 | B1* | 6/2025 | Mancuso | G06F 16/9537 |
| 2022/0230061 | A1* | 7/2022 | Singh | G06F 40/20 |
| 2024/0126794 | A1* | 4/2024 | Cook | H04L 51/02 |
| 2024/0202464 | A1* | 6/2024 | Poirier | G06F 40/20 |
| 2025/0021474 | A1* | 1/2025 | Madan | G06N 3/088 |
| 2025/0148219 | A1* | 5/2025 | Jauhar | G06F 16/288 |

* cited by examiner

Primary Examiner — Dangelino N Gortayo
(74) Attorney, Agent, or Firm — K&L Gates LLP

(57) ABSTRACT

Systems, apparatuses, methods, and techniques are described for feedback-based multimodal fragment retrieval. An example method includes receiving user input data comprising a user search query. The example method also includes determining, based on the first user search query, a first and second set of search parameters. The example method also includes generating search execution plan. The example method also includes retrieving, based on executing the search execution plan with respect to a set of candidate retrieval sources, a first set of relevant multimodal fragments. The example method also includes generating a first multimodal search result object, wherein the first multimodal search result object comprises at least a subset of the first set of relevant multimodal fragments. The example method also includes providing the first multimodal search result object to at least a first user device associated with the first user.

20 Claims, 8 Drawing Sheets

FEEDBACK-BASED MULTIMODAL FRAGMENT RETRIEVAL SYSTEM

BACKGROUND

People can interact with computing devices using various input commands. In some systems, one or more input commands may be utilized to execute a search query. A respective computing device may provide search results to the user based on executing the search query, where the search results may or may not be relevant to the user's preferences.

DETAILED DESCRIPTION

Figure 1:
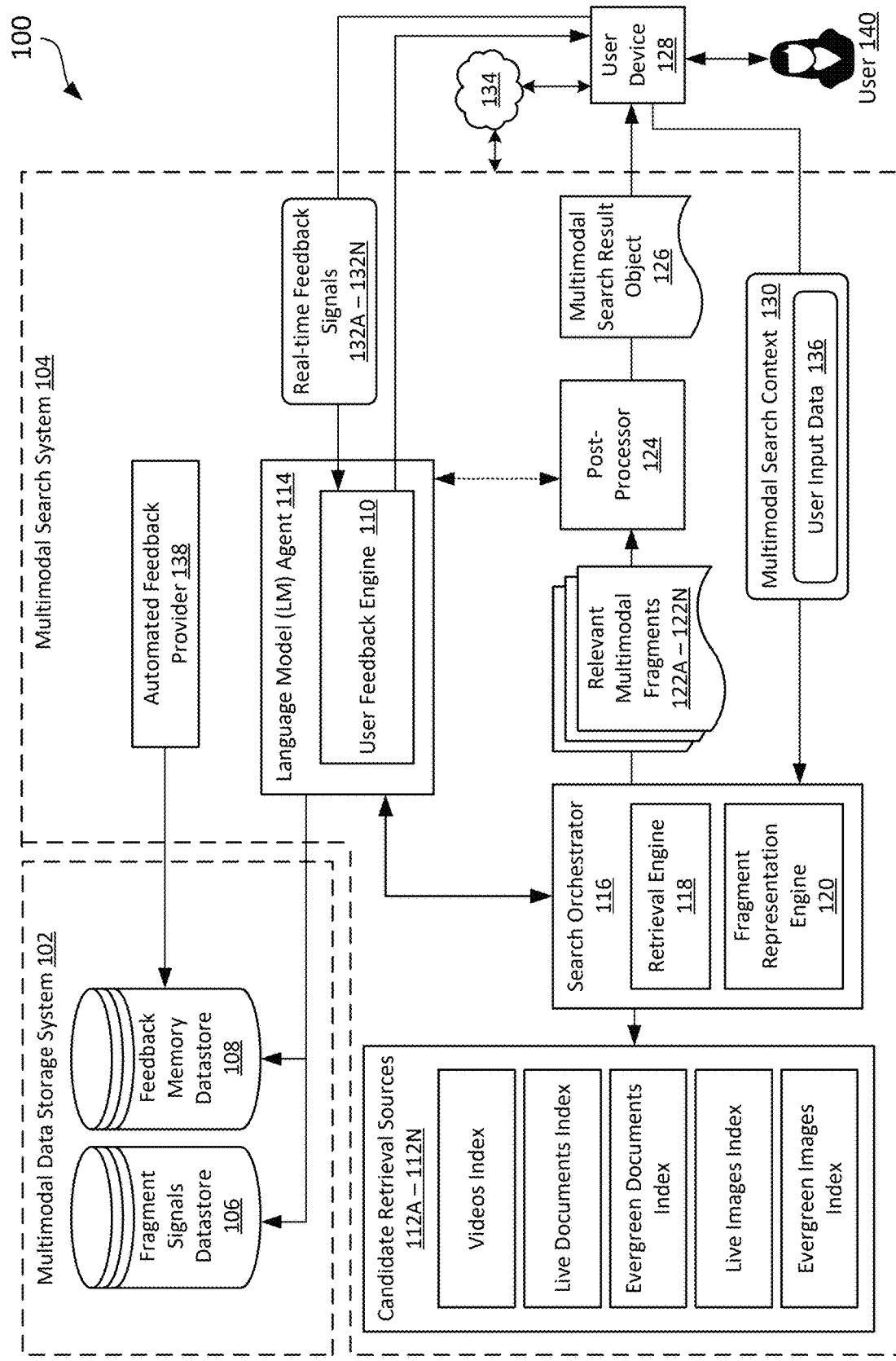
FIG. 1 is a block diagram illustrating an example system for feedback-based multimodal fragment retrieval, in accordance with various aspects of the present disclosure.

In the following description, reference is made to the accompanying drawings that illustrate several examples of the present disclosure. It is understood that other examples may be utilized, and various operational changes may be made without departing from the scope of the present disclosure. The following detailed description is not to be taken in a limiting sense, and the scope of the embodiments of the present invention is defined only by the claims of the issued patent.

Devices with integrated processing capabilities are often configured with network communication capability and/or other computing functions allowing the devices to send data to and/or receive data from other devices. In some examples, such devices may include virtual assistants and/or other natural language processing (NLP) interfaces that may be used to control the devices, answer questions, communicate with other people/devices, and/or otherwise interact with the devices and/or other devices. As such devices become increasingly prevalent in both the home, office, public spaces, quasi-public spaces (e.g., hotels, offices, retail spaces), and elsewhere generally, and as the technology matures, new services and features are being developed. For instance, in some cases devices may be paired or otherwise grouped together with one another to enable certain functionality. For example, a device that includes voice-based virtual assistant functionality may be paired with a device including a display so that spoken commands may be used to control content output by the display device. In another example, content may be transferred from one device to another device in response to user requests and/or other triggering events (e.g., If This Then That (IFTTT) recipes, presence information, etc.).

Some natural language processing flows may employ one or more language models (LMs) in order to process natural language requests. An LM is an artificial intelligence (AI) model that may be capable of processing and generating human-like text based on the latent information it has learned from vast amounts of training data. LMs include "large language models" where the term "large" refers to the size of these models in terms of the number of parameters or weights, which are the values that the model learns during training to make predictions and generate text. LMs may have millions, billions (or even more) parameters, which enable such models to capture complex patterns and nuances in language that, in turn, allow the models to understand and generate more natural-sounding text (relative to previous approaches). Some examples of LMs include the generative pre-trained transformer models (e.g., GPT-3, GPT-4), BERT (bidirectional encoder representations from Transformers), etc.

In a generative context, a conventional LM may generate text that is responsive to the input prompt provided to the LM. Conventional LMs excel at generating natural sounding text that appears as though it has been generated by a native speaker in the relevant language. In addition to fluency, generative LMs are able to generate detailed, relevant, and largely accurate responses to input prompts in many cases due to the large amount of latent information the generative LM has learned during training. However, in some cases, a conventional LM may lack the ability to reason or take various actions and, furthermore, may have limited memory.

In the same field of technology, AI-based LM agents may be developed that improve upon the functionality of conventional LMs while also being personalized for a particular user. For instance, in some cases, an LM agent may be configured to remember past user interactions (e.g., conversations, search queries, commands) with a particular user and use said past user interactions to inform future user interactions. While conventional LMs may be configured to utilize external software tools and execute multi-step plans in order to accomplish a desired task (e.g., solve mathematical problems, generate text based on creative writing prompts), conventional LMs may have limited capacity for generating responses based on various user preferences.

In some cases, an LM agent may be integrated with an LM that has been pre-trained on massive datasets that include a wide variety of text from various sources, enabling the LM to understand grammar, context, and the relationships between words and sentences. An LM agent may be configured to access tailored datasets associated with a particular user and/or enterprise such that an LM agent has a particular knowledge base. Similarly, as will be described herein, an LM agent may be configured to consider current events and/or trending data on both local and global levels such that any model output (e.g., multimodal search results) generated by the LM agent may be relevant to the user's specific contextual situation.

Additionally, an LM agent may be configured to integrate with various interfaces which enable the LM agent to interact with external services and/or datastores. For example, an LM agent may be configured to determine an appropriate application programming interface (API) to use to satisfy a particular user request and execute a relevant API call. Furthermore, an LM agent may enhance the capabilities of a conventional LM by being configured to execute various program code and/or data analysis. Further still, an LM agent may be configured to implement various reasoning techniques to solve complex problems, among which may include the generation of an actionable plan comprised of various sub-tasks, steps, operations, and/or the like.

While conventional LMs may be configured to leverage various NLP techniques to create various text-based content (e.g., text-based chat generation for a virtual assistant), conventional LMs are not known to be proficient content that is contextually accurate and/or grounded in a real-world knowledge domain. As such, conventional LMs may produce model output (e.g., text-based content) in response to various user queries that is not contextually accurate and/or factually accurate (e.g., the mode output may be an incorrect "hallucination" generated by the conventional LM). Furthermore, conventional LMs may not be proficient in generating model output that is temporally accurate or model output that is based on current events, news items, or trending subject matters-especially at a local level (e.g., a current trend associated with a specific geolocation).

Additionally, conventional LMs may not be configured to access or maintain a memory that can be continuously updated and/or used to remember various interactions with a user in order to preserve various contexts associated with prior interactions (e.g., prior conversations, prior searches). As such, conventional LMs may not be configured to proficiently recall various preferences, opinions, and/or feedback associated with a respective user and, therefore, may not be capable of generating model output for a user that is personalized based on the user's preferences, opinions, and/or feedback. Further still, conventional LMs may not be configured to generated and/or execute various actions, commands, and/or plans on behalf of the user. As such, conventional LMs produce model output that is not relevant to a respective user's preferences and/or feedback and may not be capable of learning how to provide personalized model content to the respective user.

To address these and other technical problems, a feedback-based multimodal fragment retrieval system capable of devising and orchestrating search execution plans for generating multimodal search result objects based on inferred user preferences is provided herein. Such multimodal search result objects may comprise multimodal fragments (e.g., multimodal search results) consisting of text data, image data, video data, and/or the like that are relevant to a user search query as well as various contextual information related to the user and/or the device used to make the user search query. In some examples, a multimodal fragment may be understood as a search result such as a data file (or a relevant portion of a source data file), a data object, and/or the like (e.g., a document, image, video, visual graphic, and/or the like that can be accessed by a user device). A respective multimodal fragment may be an entire data file, a relevant portion (e.g., subset of data) of a source data file (e.g., a portion of text of a source document) or, in some examples, a combination of portions of respective data files (e.g., an extracted video frame of a source video file combined with a portion of relevant text from a source document).

In some examples, various user preferences associated with a particular user are inferred by harnessing user-specific, real-time feedback signals (with all applicable user permissions for storage, access, and/or use of such data) associated with previously-provisioned multimodal search results. The inferred user preferences may correspond to a respective query formulation (e.g., a query comprising a question in a format such as "What is the difference between x and y?" or "How do I xyz?"). In this regard, the inferred user preferences may relate to a preferred multimodal fragment sequence (e.g., a preferred ordering of multimodal data), a preferred multimodal fragment modality type, and/or the like that a user has previously responded to with positive feedback.

In various examples described herein, a feedback-based multimodal fragment retrieval system may employ a search orchestrator integrated with an LM agent to process a natural language request submitted by a user. In some examples, the search orchestrator may generate a prompt from automatic speech recognition (ASR) output data representing a spoken user utterance which may be fed into the LM agent. In other examples, a text input (e.g., text typed on a keyboard) may be used as an input prompt (or may be used to generate an input prompt) to the LM agent. The LM agent may be trained to output a search execution plan comprising various search parameters. In some examples, the various search parameters are associated with semantic search data (e.g., recall parameters, text strings and/or substrings, query formulations, tokenized words, search terms, and/or the like) which may be formatted into a series of computer-executable actions (including API calls to various subsystems) that may be taken to process the natural language request. As will be described herein, the search orchestrator may execute the search execution plan over a set of candidate retrieval sources comprising various data (e.g., multimodal fragments) which may be relevant to a particular user search query associated with the natural language request. A post-processor may be employed to generate a multimodal search result object comprising a subset of retrieved multimodal fragments, where the multimodal search result object is generated according to various user preferences inferred based on real-time feedback signals associated with the user.

In this regard, the feedback-based multimodal fragment retrieval system may improve upon conventional search systems that rely only on basic search techniques (e.g., keyword search) by considering a user's feedback (e.g., both explicit feedback and implicit feedback). Furthermore, the feedback-based multimodal fragment retrieval system may automate various operations and processes based on a user's feedback and preferences. For example, the feedback-based multimodal fragment retrieval system may infer that a user prefers a particular multimodal fragment modality type and may therefor automatically identify and determine a relevant candidate retrieval source (e.g., a deep semantic index) comprising data related to the user's preferred multimodal fragment modality type without explicit instruction or intervention on the part of the user (e.g., without the user having to identify they wish to see a side-by-side comparison of subjects, or an instructional video).

Additionally, the feedback-based multimodal fragment retrieval system may learn a user's preferred multimodal fragment sequence for a particular type of user search query. For example, if a user makes a query asking how to learn a new skill (e.g., "How do I spatchcock a chicken?"), the feedback-based multimodal fragment retrieval system may infer, based on previously received feedback signals detected with respect to past user search queries, that the user prefers to first view an instructional video and then a series of images illustrating step-by-step instructions rather than first reading a portion of text and then accessing a video. In this regard, the feedback-based multimodal fragment retrieval system provides improvements over conventional technologies related to virtual assistants, smart home devices, search systems, and/or the like by not only providing a user with relevant results, but also providing the relevant results in a preferred format and/or preferred sequence based on an automatically inferred set of user preferences indicated by various feedback signals collected from the user over time.

As such, by streamlining various search tasks and user preference inference tasks, the feedback-based multimodal fragment retrieval system reduces the demand for computational resources (e.g., on an enterprise server system) by eliminating a user's need to make redundant searches for relevant content that is also in a preferred format (e.g., multiple searches using similar queries in order to locate relevant content in a preferred modality). Furthermore, as will be described in greater detail herein, the feedback-based multimodal fragment retrieval system improves upon conventional LM techniques by leveraging contextual fragment data associated with current trends on both a large-scale level (e.g., national level) and a hyper-local level (e.g., trends associated with a specific geolocation, such as a city in which the user lives).

The various techniques described herein may be used in a variety of contexts, including in natural language processing enabled devices (e.g., devices employing voice control and/or speech processing "voice assistants") and/or systems. Examples of multimodal fragment retrieval systems and/or voice-enabled personal assistants include the Siri system from Apple Inc. of Cupertino, California, voice-enabled actions invoked by the Bard assistant or the Google Assistant system from Google LLC of Mountain View, California, Dragon speech recognition software or the Copilot system from Microsoft of Redmond, Washington, the Alexa system from Amazon.com, Inc. of Seattle, Washington, etc. Other examples of smart home devices and/or systems that may use the various content-based voice targeting techniques described herein may include Google Nest Smarthome products from Google LLC, HomeKit devices from Apple Inc., various smart doorbells (e.g., with integrated cameras and/or natural language processing capability), etc. For example, some models of Ring camera-integrated doorbells include Alexa speech processing functionality to allow users to have a virtual assistant interact with people at the door to take messages, etc.

Natural language processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more users.

Storage and/or use of data related to a particular person or device (e.g., device identifier data, device names, names of device groups, contextual data, and/or any personal data) may be controlled by a user using privacy controls associated with a speech processing enabled device and/or a companion application associated with a speech processing enabled device. Users may opt out of storage of personal, device state (e.g., a paused playback state, etc.), and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the device and/or device group names and/or any data captured by such devices may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

Machine learning techniques, such as those described herein, are often used to form predictions, solve problems, recognize objects in image data for classification, etc. In various examples, machine learning models may perform better than rule-based systems and may be more adaptable as machine learning models may be improved over time by retraining the models as more data becomes available. Accordingly, machine learning techniques are often adaptive to changing conditions. Deep learning algorithms, such as neural networks, are often used to detect patterns in data and/or perform tasks.

Generally, in machine learning models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Transformer models are machine learning models that include an encoder network and a decoder network. LMs are often implemented using transformer models. The encoder takes an input (e.g., a "prompt") and generates feature representations (e.g., feature vectors, feature maps, etc.) of the input. The feature representation is then fed into a decoder that may generate an output based on the encodings. In natural language processing, transformer models take sequences of words as input. A transformer may receive a sentence and/or a paragraph (or any other quantum of text) comprising a sequence of words as an input.

The encoder network of a transformer comprises a set of encoding layers that processes the input data one layer after another. Each encoder layer generates encodings (referred to herein as "tokens"). These tokens include feature representations (e.g., feature vectors and/or maps) that include information about which parts of the input data are relevant to each other. Each encoder layer passes its token output to the next encoder layer. The decoder network takes the tokens output by the encoder network and processes them using the encoded contextual information to generate an output (e.g., the aforementioned one-dimensional vector of tokens). The output data may be used to perform task-specific functions (e.g., search execution plan generation for an LM-based multimodal fragment retrieval operation, etc.).

The feedback-based multimodal fragment retrieval system described herein provides numerous improvements to conventional data retrieval systems. For example, not only does the feedback-based multimodal fragment retrieval system leverage an LM agent to retrieve relevant results for a user, the feedback-based multimodal fragment retrieval system interprets real-time feedback signals (both explicit and implicit feedback signals) associated with the user to ensure that multimodal search results are presented to the user according to the user's preferences. Additionally, the feedback-based multimodal fragment retrieval system may be configured to analyze a search context associated with the user (e.g., a type of device being used, a geolocation of the user, and/or the like) in addition to various evolving trends when generating multimodal search results. As such, the feedback-based multimodal fragment retrieval system ensures that a user is provided with hyper-personalized and fresh multimodal search results in a preferred format (e.g., a preferred modality) and/or sequence (e.g., a preferred ordering of multimodal fragments) that aligns with the user's preference. Furthermore, the feedback-based multimodal fragment retrieval system may leverage the real-time feedback signals associated with the user to determine potential misinformation comprised in one or more datastores and/or candidate retrieval sources and take automatic action to correct, update, and/or remove the misinformation, thereby ensuring the accuracy of future multimodal search results.

FIG. 1 is a block diagram illustrating an example feedback-based multimodal fragment retrieval system 100, in accordance with various aspects of the present disclosure. In various examples, the feedback-based multimodal fragment retrieval system 100 may be implemented by a user device (e.g., a user device 128, such as a natural language processing-enabled device) and/or by a remote system configured in communication with a user device or other computing device that may receive input (e.g., text, speech, selection indications, etc.).

As described herein, the feedback-based multimodal fragment retrieval system 100 employs an LM agent (e.g. LM agent 114), a search orchestrator (e.g., search orchestrator 116), and a post-processor (e.g., post-processor 124) to curate multimodal search results in response to user queries based on real-time feedback signals (e.g., real-time feedback signals 132A-132N) received from a user, as well as currently trending search topics. The multimodal search results may be multimodal fragments organized in a multimodal search result object (e.g., an electronically managed data object, where the multimodal fragments may be digital content in various formats including carious text data formats, audio data formats, image data formats, and/or video data formats. As will be described in further detail herein, the search orchestrator 116 may leverage the fragment representation engine 120 to determine an order or sequence of relevant multimodal fragments 122A-122N for a multimodal search result object based on inferred user preferences related to a preferred multimodal fragment sequence and/or a preferred multimodal fragment modality type based on prior real-time feedback signals received from the user.

The feedback-based multimodal fragment retrieval system 100 may leverage the LM agent 114 to define various search parameters for a search execution plan based on a respective user search query and similar previous user search queries executed on behalf of the user, where the previous user search queries and corresponding multimodal search result objects may be associated with real-time feedback signals provided by the user. As such, the feedback-based multimodal fragment retrieval system 100 is designed to learn how to present multimodal search result content to a user based on a particular user search query, the subject matter of the user search query, as well as other multimodal search context data (e.g., location data, user device data) related to the user and/or the user's device (e.g., user device 128). For example, the feedback-based multimodal fragment retrieval system 100 may determine that a particular user prefers video fragments (e.g., video content) and/or visual graphics (e.g., image fragments) when querying about the difference between various subjects (e.g., "What's the difference between dogs and wolves") and may determine that the particular user prefers short answers (e.g., simple text or short audio responses) when querying about the current score of a live sporting event.

As illustrated in FIG. 1, the example feedback-based multimodal fragment retrieval system 100 comprises a multimodal data storage system 102 and a multimodal search system 104. The multimodal data storage system 102 comprises a fragment signals datastore 106 and a feedback memory datastore 108. In some examples, the multimodal data storage system 102 may be an offline or "near-line" storage system. The multimodal search system 104 comprises a user one or more candidate retrieval sources 112A-112N, a LM agent 114, a search orchestrator 116, a post-processor 124, and an automated feedback provider 138. In some examples, the LM agent 114 may embody, integrate with, and/or otherwise leverage a user feedback engine 110, and the search orchestrator 116 may embody, integrate with, and/or otherwise leverage a retrieval engine 118 and/or a fragment representation engine 120. As shown, in some examples, a user 140 may interact with the multimodal search system 104 via a user device 128 by way of a communications network 134 (e.g., a telecommunications network (e.g., 5G network), wide area network (WAN), local area network (LAN), wireless Internet network, near-field communication (NFC) network, and/or the like capable of facilitating remote network communications between two or more computing devices).

In some examples, a user (e.g., user 140) may interact with the feedback-based multimodal fragment retrieval system 100 via a software application instance, where the software application instance may be configured to facilitate one or more of the various feedback-based multimodal fragment retrieval processes described herein. In various examples, the software application instance associated with the feedback-based multimodal fragment retrieval system 100 may be installed and/or downloaded to a computing device (e.g., a user device 128) and may present one or more user interface configurations to a respective user (e.g., user 140). As such, the software application instance associated with the feedback-based multimodal fragment retrieval system 100 may be configured to guide a user through one or more of the various operations described herein.

For example, the software application instance associated with the feedback-based multimodal fragment retrieval system 100 may be configured to cause display of various interactive user interface elements to the user to facilitate the submission of various user input data 136. In various examples, the interactive user interface elements may be configured as one or more interactive text fields, buttons, selectable images, hyperlinks, radio buttons, sliders, embedded multimedia modules, maps, charts, graphs, prompts, notifications, banners, instructions, and/or the like configured to initiate execution of one or more commands (e.g., executable software instructions) designed to facilitate the capture of one or more portions of user input. In this regard, a user (e.g., user 140) may be enabled to interact with the feedback-based multimodal fragment retrieval system 100 via a number of technological platforms and in various ways. For example, the user may interact with the multimodal search system 104 via a smart home device, a software application instance running on a user device (e.g., a smartphone, laptop), a web browser extension (e.g., a plugin, auxiliary software application embedded in the web browser), an embedded computing device (e.g., a central computing device in an automobile), and/or the like.

As such, the user may be enabled to interact with the multimodal search system 104 in a number of ways including conversational speech (e.g., a natural language request), text-based communication (e.g., direct text input), a user selection indication (e.g., an interaction with a user interface), and/or via various body gestures. In this regard, a user device 128 may be a known computing device in the art such as a smartphone, laptop, tablet computer, smart home device (e.g., virtual assistant device), a home automation system device, Internet of Things (IoT) device (e.g., network-capable appliance), and/or the like. Additionally, in various examples, the software application instance associated with the feedback-based multimodal fragment retrieval system 100 may be configured to enable a user to access a software application framework related to a respective enterprise by, for example, granting (e.g., transmitting, enabling, toggling, configuring, etc.) one or more access permissions to a user device (e.g., user device 128) associated with the user, where the one or more access permissions enable the user device to access the software application framework associated with the enterprise.

In various examples, a user device 128 may be a natural language processing enabled device and may include a "wakeword" detection component. The wakeword detection component may process audio data captured by microphones of a speech processing enabled device and may determine whether or not a keyword and/or phrase, which are collectively sometimes referred to herein as a wakeword, is detected in the audio data. In some examples, when a wakeword is detected, the speech processing enabled device may enter a "sending mode," "audio capturing mode," and/or other type of processing mode in which audio detected by the microphones following the wakeword (e.g., user input data 136 representing a user search query spoken after the wakeword) may be sent to natural language processing computing component(s) (either locally or remotely) for further natural language processing (e.g., ASR, natural language understanding (NLU), LM inference, etc.). In various examples, the wakeword detection component may be used to distinguish between audio that is intended for the feedback-based multimodal fragment retrieval system 100 and audio that is not intended for the feedback-based multimodal fragment retrieval system 100. In some examples, detection of a wakeword by the wakeword detection component may cause the user device 128 to transmit a signal to the feedback-based multimodal fragment retrieval system 100 to initiate a multimodal fragment search operation based on various user input data 136.

In various examples, user input data 136 may be captured by one or more components of a respective user device (e.g., user device 128) such a microphone, touchscreen, camera (e.g., front-facing camera, rear-facing camera), and/or one or more sensors. In some examples, user input data 136 may be audio data (e.g., utterances, natural language requests, human speech) associated with a user search query (e.g., a request, command, instruction) for which a user (e.g., user 140) expects various multimodal fragment data in response. Additionally or alternatively, user input data 136 may be text data and/or selection data (e.g., user interface interaction data) associated with a respective user search query. Additionally or alternatively, in some examples, user input data 136 may be provided by a user (e.g., user 140) via a user device (e.g., user device 128) based on a prompt (e.g., feedback prompt) generated by the feedback-based multimodal fragment retrieval system 100, where the prompt may be a request for user feedback related to a multimodal search result object provided in response to a respective user search query. In such examples, a user search query may serve as an input into the LM agent 114 and may be a request to perform some task. The specific task may vary.

A user search query may be a request for data about a particular subject or knowledge domain, a request to answer a question, a request to compare information, a request to solve a math problem, a request play a song or playlist, a request to update a list (e.g., a to-do list) or calendar, and/or the like. For example, the user 140 may utilize the user device 128 to provide user input data 136 comprising the user search query "Explain the different types of rose" to the feedback-based multimodal fragment retrieval system 100.

As shown in FIG. 1, the user input data 136 may be associated with a multimodal search context 130 associated with a user (e.g., the user 140) and/or a user device (e.g., the user device 128) associated with the user. In some examples, the multimodal search context 130 may be data that indicates relevant information related to the user 140, the user device 128, and/or the user input data 136. For example, the multimodal search context 130 may comprise data associated with a current geolocation associated with the user 140 and/or user device 128 (e.g., based on global positioning service (GPS) coordinates obtained by the user device 128) when the user 140 submitted the user search query "Explain the different types of rose". Additionally or alternatively, the multimodal search context 130 may comprise device attribute data associated with the user device 128, where the device attribute data indicates various hardware components, hardware capabilities, firmware and/or software specifications, a device type, and/or device restrictions associated with the user device 128. For example, device attribute data may indicate whether a particular user device (e.g., user device 128) has an electronic display, a touch screen, softkeys, buttons, loudspeakers, microphones, and/or the like that may affect the user device's ability to generate user input data 136 and/or provide certain types of multimodal fragments associated with multimodal search result objects (e.g., a user device 128 with no electronic display cannot display video content retrieved by the search orchestrator 116).

As shown, the search orchestrator 116 may be configured as an interface between the LM agent 114, the post-processor 124, and/or a respective user device (e.g., user device 128). As such, the search orchestrator 116 may be configured to receive and/or retrieve a multimodal search context 130 and/or user input data 136 from a respective user device (e.g., user device 128) in order to determine a user search query by processing information associated with the multimodal search context 130 and/or the user input data 136. In this regard, the search orchestrator 116 may comprise and/or leverage various natural language processing computing component(s) (either locally or remotely) for further natural language processing (e.g., ASR, NLU, LM inference, etc.) in order to process various user input data 136 (e.g., utterances, text data) to determine a user search query. By way of continued example, the search orchestrator 116 may be configured to parse the user input data 136 to determine the user search query "Explain the different types of rose." Additionally, the search orchestrator 116 may be configured to process a multimodal search context 130 in order to determine user device attributes associated with a user device (e.g., user device 128) utilized to generate the user input data 136.

In some examples, the search orchestrator 116 may be configured to enforce various predetermined constraints during the execution of the various feedback-based multimodal fragment retrieval processes described herein. In some examples, the predetermined constraints may be associated with various LM guardrails configured to ensure that any multimodal fragments retrieved from one or more candidate retrieval sources 112A-112N as a result of a respective user search query are appropriate, unbiased, non-sensitive, and/or free of misinformation. For example, various LM guardrails enforced by the search orchestrator 116 may ensure that any returned multimodal fragments do not exhibit any social bias (e.g., bias towards a particular race or ethnicity, bias towards a particular gender or gender identity) and/or product bias (e.g., bias towards a particular brand, company, service, product, institution), and/or the like. Additionally, the various LM guardrails may ensure that data is validated and/or sourced only from trusted domains, datastores, and/or systems.

In various examples, LM guardrails may be defined by an enterprise with which the feedback-based multimodal fragment retrieval system 100 is associated and configured to ensure adherence to various data privacy standards and/or to ensure users are not exposed to harmful, biased, and/or false information, search results, media, and/or the like. For example, various LM guardrails enforced by the search orchestrator 116 may ensure that various graphic content (e.g., violent media, inappropriate and/or uncouth content) is not presented to the user. Additionally or alternatively, the various predetermined constraints enforced by the search orchestrator 116 may be configured to ensure the relevance of any multimodal fragments retrieved from one or more candidate retrieval sources 112A-112N. For example, the predetermined constraints may ensure that any returned multimodal fragments are temporally relevant (e.g., associated with fresh data and/or a particular timeframe) and/or topically relevant (e.g., associated with data in which the user is interested in).

As shown, the search orchestrator 116 may be configured to provide a user search query derived from respective user input data 136 to the LM agent 114. The LM agent 114 may be configured to optimize various system configurations for multimodal search use-cases (e.g., top-k text fragments, top-k image fragments, top-k interleaved text/image fragments). As such, the LM agent 114 may be configured to perform dynamic hyper-parameter tuning based off a deep understanding of a respective multimodal search context 130, an in-context understanding of real-time user feedback signals (e.g., real-time user feedback signals 132A-132N), and/or in-context and relevant historical user search query and candidate retrieval sources. The LM agent 114 performs continuous learning via fine-tuning alignment with a current user search query and feedback domain distribution.

In this regard, the LM agent 114 may be configured to define one or more sets of search parameters to execute via a retrieval engine (e.g., retrieval engine 118 associated with the search orchestrator 116) over one or more candidate retrieval sources 112A-112N. The LM agent 114 may be configured to utilize a feedback memory datastore 108 comprising data related to previous user interactions and/or positive and/or negative feedback related to previously retrieved relevant multimodal fragments in order to generate determine various search parameters to be included in a respective search execution plan. Additionally, the LM agent 114 may be configured to utilize a fragment signals datastore 106 to understand various requirements for a respective user search query. For example, the LM agent 114 may be configured to determine whether a particular multimodal fragment modality type (e.g., an image, video, audio, tabular, list of text and images, and/or the like) is well-suited for satisfying the respective user search query.

By way of continued example, the search orchestrator 116 may receive the user input data 136 related to the utterance comprising the respective user search query "Explain the different types of rose." The search orchestrator 116 may then query the LM agent 114 to define a search execution plan to retrieve various multimodal fragments relevant to the user search query (e.g., videos, images, documents, portions of text, graphical representations, statistics, and/or the like related to various varieties of roses). After the LM agent 114 receives the utterance comprising the user search query, the LM agent 114 may perform a semantic search in the feedback memory datastore 108 to identify and/or retrieve one or more past user search queries (e.g., previous utterances, previous text-based queries) that are similar to the respective user search query. In some such examples, the LM agent 114 may be configured to initiate and/or execute one or more API calls configured to perform the semantic search in the feedback memory datastore 108 based on the user search query.

The feedback memory datastore 108 may be configured as a deep semantic index comprising data related to previous user search queries, previous search parameters associated with previously executed search execution plans generated based on the previous user search queries, previously retrieved relevant multimodal fragments (e.g., relevant multimodal fragments 122A-122N) retrieved based on the previously executed search execution plans, and/or feedback states associated with the previously retrieved relevant multimodal fragments. In some examples, the feedback state may be generated based on one or more real-time feedback signals 132A-132N received from a user 140 and may be a positive feedback state or a negative feedback state. The various data comprised in the feedback memory datastore 108 may be tokenized, indexed, and semantically represented by respective embeddings (e.g., multidimensional numerical representations that convey the meaning, intent, and/or context of the various data). Additionally, as will be described in further detail herein, the data comprised in the feedback memory datastore 108 may be used as few-shot examples and/or memory for the LM agent 114.

The LM agent 114 may be configured to employ various reinforcement learning techniques in order to provide a user (e.g., user 140) with multimodal search results based on past real-time feedback signals obtained from the user. In this regard, the LM agent 114 may instantiate and employ one or more of a memory retention plan and/or an exploration plan. In such examples, the memory retention plan keeps track of the most similar previous user search queries and any corresponding feedback signals, whereas the exploration plan is configured to explore new information that might be useful and/or relevant to a user. The LM agent 114 balances the utilization of the memory retention plan and the exploration plan by measuring a success metric and/or positive feedback rate for associated with the memory retention plan.

In various examples, the memory retention plan continuously generates a multimodal search result feedback map of previous user search queries, previous search parameters associated with previously executed search execution plans generated based on the previous user search queries, previously retrieved relevant multimodal fragments retrieved based on the previously executed search execution plans, and/or feedback states associated with the previously retrieved relevant multimodal fragments. Furthermore, the memory retention plan keeps an overall feedback rate and/or other supporting metrics related to previous user search queries and the corresponding multimodal fragments retrieved as a result (e.g., a number of times positive or negative feedback was received from the user).

For example, the feedback-based multimodal fragment retrieval system 100 may have received a first previous user search query (e.g., a respective utterance) associated with a first query formulation such as "What are the different types of x?" (e.g., planets). In such an example, a user may have been presented with relevant multimodal fragments (e.g., relevant multimodal fragments 122A-122N) configured as a side-by-side table with images of various types of x (e.g., planets), along with key information (e.g., textual information) defining the types of x, as well as a list of the key differences in the key information. Additionally, the relevant multimodal fragments (e.g., relevant multimodal fragments 122A-122N) may have been comprised in a respective multimodal search result object 126 in a particular multimodal fragment sequence (e.g., a particular ordering of multimodal fragments). In this example, the user feedback engine 110 may have received one or more real-time feedback signals 132A-132N indicating positive feedback from a user (e.g., user 140) in response to the relevant multimodal fragments (e.g., relevant multimodal fragments 122A-122N).

By way of continued example, the feedback-based multimodal fragment retrieval system 100 may have received, at a different time, a second previous user search query (e.g., a different utterance) associated with a similar query formulation as the first query formulation, such as "How many types of w are there?" (e.g., coral). In this instance, the user may have been presented with a respective multimodal search result object 126 comprising a relevant multimodal fragment configured as a single, short piece of text indicating a number of known w (e.g., a number of known coral species) with no other accompanying multimodal fragments. In this example, the relevant multimodal fragment may have received one or more real-time feedback signals 132A-132N indicating negative feedback from the user (e.g., user 140).

In this regard, based on the real-time feedback signals 132A-132N received from the user based on the respective multimodal search result objects provided based on the first previous user search query and the second previous user search query, the LM agent 114 may determine (e.g., infer) that the user prefers one or more of a particular multimodal fragment modality type and/or a particular multimodal fragment sequence in response to a user search query associated with a particular query formulation (e.g., "What are the different types of x?"). Accordingly, when the user (e.g., user 140) provides the user search query "Explain the different types of rose," the LM agent 114 may present to the user a multimodal search result object 126 comprising one or more relevant multimodal fragments associated with a positive feedback state, where the one or more relevant multimodal fragments are presented in a same or similar multimodal fragment sequence and/or of a same or similar multimodal fragment modality type as were presented in response to receiving a previous user search query having the same or similar query formulation. As such, the LM agent 114 may leverage the memory retention plan to determine various search parameters for a respective user search query based on the feedback signals associated with previous user search queries.

In this regard, in some examples, the memory retention plan comprises determining, based on a particular query formulation associated with a user search query, a preferred multimodal fragment sequence of the first user, where a corresponding multimodal search result object may be generated based in part on the preferred multimodal fragment sequence. For example, the LM agent 114 may determine, based on feedback data comprised in the feedback memory datastore 108, that a user prefers a particular sequence (e.g., ordering) of multimodal fragment modality types for certain types of user search queries (e.g., a first video, then a first portion of text, followed by a series of informational images). Additionally or alternatively, in some examples, the memory retention plan comprises determining, based on a particular query formulation associated with respective user search query, a preferred multimodal fragment modality type of the first user, where a corresponding multimodal search result object may be generated based in part on the preferred multimodal fragment modality type (e.g., a user may prefer video fragments over long-form text fragments). Additionally or alternatively, in some examples, the memory retention plan comprises determining a subject matter associated with a particular user search query, where one or more of a preferred multimodal fragment sequence and/or a preferred multimodal fragment modality type of a corresponding multimodal search result object 126 are generated based in part on the subject matter.

In addition to (or in lieu of) employing the memory retention plan, the LM agent 114 may be configured to employ the exploration plan. The exploration plan may be configured to determine which possible new search parameters may be possible and/or relevant to the user based on a respective user search query. The exploration plan may be used as reinforcement learning for the LM agent 114 in that the exploration plan utilizes a form of trial and error to solicit real-time feedback signals 132A-132N based on the provision of various multimodal fragments. Furthermore, the LM agent 114 may be configured to query the fragment signals datastore 106 as part of an evolving trend identification plan. In this regard, the fragment signals datastore 106 may comprise various contextual fragment data, where the contextual fragment data comprises data related to previous external user search queries generated by one or more external users. In various examples, the previous external user search queries may be associated with one or more of trending topics, trending news items, and/or trending events. Furthermore, the contextual fragment data may comprise a previously retrieved multimodal fragments as well as the corresponding feedback states received based on the set of previous external user search queries.

Based on such contextual fragment data, the evolving trend identification plan may be configured to identify various trends and/or current news cycles that may be relevant to a user search query. By way of continued example, in the case of the user search query "Explain the different types of rose," the evolving trend identification plan may be employed to determine whether "rose" is a new trend in entertainment or whether a new type of rose has been discovered. As such, the intent of the evolving trend identification plan is to understand and include novel topics when executing a respective search execution plan. In this regard, any relevant trends, topics, news items, current events, and/or the like may be used to determine search parameters accordingly, as well as adapt to out-of-distribution user search queries (e.g., out-of-distribution utterances).

Additionally, in some examples, the contextual fragment data stored in the fragment signals datastore 106 may be associated with a predetermined time window (e.g., a two week window, a thirty day window), where the predetermined time window may be used to determine whether certain trends, topics, news items, current events, and/or the like are considered temporally relevant. In such examples, the previous external user search queries and the previously retrieved multimodal fragments of the contextual fragment data may be associated with frequency data. The frequency data may indicate a number of times one or more previous external user search queries have been received by the feedback-based multimodal fragment retrieval system 100 during the predetermined time window. Additionally, the frequency data may indicate a number of times one or more previously retrieved multimodal fragments have been retrieved during the predetermined time window.

As such, after receiving the user search query "Explain the different types of rose" from the user device (e.g., user device 128), the LM agent 114 may be configured to utilize one or more of the memory retention plan, exploration plan, and/or the evolving trend plan, to determine similar past user search queries, similar past search execution plans, corresponding multimodal fragments retrieved based on said similar past search execution plans, as well as the corresponding feedback states (e.g., positive or negative feedback states) associated with the corresponding multimodal fragments. The LM agent 114 may utilize such positive and negative feedback states in various in-context learning techniques to derive a final feedback state and one or more search parameters to execute with respect to the user search query. For example, the LM agent 114 may utilize embeddings associated with past successful user search queries and/or previously retrieved multimodal fragment result objects (e.g., similar past user search queries and/or previously retrieved multimodal fragment result objects associated with positive feedback signals) comprised in one or more of the fragment signals datastore 106 and/or the feedback memory datastore 108 as in-context example input (also known as few-shot examples or few-shot prompts) and corresponding past search parameters as in-context example output. In this manner, the LM agent 114 may be configured to generate search parameters and a corresponding search execution plan associated with the user search query "Explain the different types of rose."

A search execution plan generated by the LM agent 114 may comprises various search parameters for searching over one or more candidate retrieval sources. In some examples, the search execution plan may comprise various executable program code portions configured to query and/or iterate through one or more of the candidate retrieval sources 112A-112N. In this regard, a search execution plan may comprise various sub-tasks. For example, a first sub-task associated with the search execution plan may pertain to a first candidate retrieval source (e.g., candidate retrieval source 112A configured as a video index), and a second sub-task may pertain to a second candidate retrieval source (e.g., candidate retrieval source 112B configured as a live documents index). In this regard, respective sub-task associated with the search execution plan may be associated with various types of search parameters.

In some examples, the search parameters are associated with semantic search data (e.g., recall parameters, text strings and/or substrings, query formulations, tokenized words, search terms, and/or the like) that are configured to be used in various search operations (e.g., semantic search operations) executed by the search orchestrator 116 with respect to a particular candidate retrieval source (e.g., candidate retrieval source 112C configured as an evergreen document index). Additionally or alternatively, in some examples, multiple sub-tasks associated with a search execution plan may correspond to a single candidate retrieval source, where the multiple sub-tasks comprise variations of related (e.g., similar) search parameters. As described herein, in some examples, the search parameters are associated with semantic search data (e.g., recall parameters, text strings and/or substrings, query formulations, tokenized words, search terms, and/or the like) corresponding to a common subject matter, knowledge domain, multimodal fragment modality type, and/or the like. In this manner, the search execution plan may be configured to execute a thorough search with a high probability of returning relevant multimodal fragments 112A-122N for the user.

As described herein, the search orchestrator 116 may be configured to receive and execute a search execution plan generated by the LM agent 114 (e.g., a search execution plan associated with the user search query "Explain the different types of rose"). In this regard, the search orchestrator 116 may leverage the retrieval engine 118 to search over one or more candidate retrieval sources 112A-112N based on one or more search parameters comprised in the search execution plan in order to retrieve a set of relevant multimodal fragments 122A-122N. Furthermore, the retrieval engine 118 may be configured to execute a respective search execution plan based on various predetermined constraints including one or more LM guardrails, a corresponding multimodal search context 130 (e.g., indicating geolocation data of a user (e.g., user 140)), various device attribute data associated with a user device (e.g., user device 128), and/or a data freshness requirement (e.g., temporally relevant) from which the originating user search query was provided to the feedback-based multimodal fragment retrieval system 100.

As shown in FIG. 1, the candidate retrieval sources 112A-112N may comprise one or more of a videos index, a live documents index, an evergreen documents index, a live images index, and/or an evergreen images index. In various examples, a respective candidate retrieval source (e.g., candidate retrieval source 112A) may be an index comprising embeddings (e.g., a collection of vectors associated with tokenized data configured to capture semantic relationships in the tokenized data) associated with various multimodal fragments of a particular modality type (e.g., video, image, text, and/or the like). For example, a respective candidate retrieval source 112A may be an index comprising embeddings associated with video files and/or video data. In such an example, a particular video may be processed such that each frame of the particular video is extracted as a single image. As such, each frame may be processed to generate a respective embedding that captures semantic data (e.g., context, meaning) associated with the subject matter associated with each frame, and the embeddings may be stored in the index associated with the respective candidate retrieval source 112A.

In some examples, an entire video file may be processed in this manner such that each frame of the video file is extracted to create corresponding embeddings. In other examples, a subset of the frames associated with the video may be selected to represent the video file such that each frame of the video file need not be processed, thus saving computational resources (e.g., processing power, data storage space, and/or the like). Once the respective candidate retrieval source 112A (e.g., the videos index) is generated, the search orchestrator 116 may be enabled to search the respective candidate retrieval source 112A based on text-based search parameters of a respective search execution plan generated by the LM agent 114 to retrieve a set of relevant multimodal fragments 122A-122N.

In some examples, a respective candidate retrieval source of the one or more candidate retrieval sources 112A-112N may be associated with "live" data or "evergreen" data. Evergreen data may be understood as data related to subject matters, content, information, and/or the like that remains relevant and/or accurate over any period of time (e.g., historical data related to the discovery and cultivation of various roses). For example, evergreen data may pertain to historical data and/or data related to documented events. Evergreen data may be high volume data associated with a low refresh rate. Live data may be understood as data related to subject matter, content, information, and/or the like that changes quickly, is happening in real-time, or is related to a developing matter. For example, data related to an ongoing sporting event may be considered as live data. Live data may be low volume data with a high refresh rate.

Once a set of relevant multimodal fragments 122A-122N has been retrieved based on the search execution plan (e.g., relevant multimodal fragments related to the various types of roses), the search orchestrator 116 may be configured to leverage the fragment representation engine 120 to rank and/or format the one or more relevant multimodal fragments 122A-122N before sending the one or more relevant multimodal fragments 122A-122N to the post-processor 124. In some examples, the fragment representation engine 120 may rank the one or more relevant multimodal fragments in the set of relevant multimodal fragments 122A-122N based on the respective modalities of the one or more relevant multimodal fragments 122A-122N. For instance, based on previously received real-time feedback signals (e.g., real-time feedback signals 132A-132N), the LM agent 114 may have determined that a respective user (e.g., user 140) prefers receiving video-based multimodal fragments in response to a respective user search query having a particular query formulation. As such, if a first relevant multimodal fragment of the set of relevant multimodal fragments 122A-122N is a video fragment, and a second relevant multimodal fragment is a document fragment (e.g., a text-based fragment), the fragment representation engine 120 may rank the first relevant multimodal fragment higher relative to the second relevant multimodal fragment.

Additionally or alternatively, the fragment representation engine 120 may be configured to rank the one or more relevant multimodal fragments in the set of relevant multimodal fragments 122A-122N based on the data (e.g., content, subject matter, information, context) of the respective relevant multimodal fragments. For example, if the content associated with a third relevant multimodal fragment has not been tagged (e.g., marked, flagged, indicated) as trustworthy information from a trusted source (e.g., a trusted web domain, a trusted datastore) and/or has been previously flagged as being potential misinformation, the fragment representation engine 120 may rank the third relevant multimodal fragment lower relative to the first relevant multimodal fragment and the second relevant multimodal fragment. Additionally or alternatively, if the content associated with a fourth relevant multimodal fragment is associated with a relatively low degree of similarity (e.g., a semantic similarity score) relative to one or more search parameters associated with the search execution plan (indicating that the fourth multimodal fragment may not be as relevant as other multimodal fragments retrieved by the retrieval engine 118), the fragment representation may rank the third relevant multimodal fragment lower relative to the first relevant multimodal fragment and the second relevant multimodal fragment.

In this regard, if a search execution plan executed by the search orchestrator 116 causes the retrieval of a set of relevant multimodal fragments 122A-122N configured as tables, graphics, text, videos, images, lists, and/or various combinations of tables, graphics, text, videos, images, lists, the search orchestrator 116 may rank the relevant multimodal fragments 122A-122N to determine a list of top-k relevant multimodal fragments 122A-122N. The search orchestrator 116 may be configured to flag and/or otherwise indicate the relative rankings of the top-k relevant multimodal fragments 122A-122N. In some examples, the search orchestrator 1116 may be configured to ensure that each of the top-k relevant multimodal fragments 122A-122N satisfies a predetermined relevance threshold. For example, the search orchestrator 116 may be configured to determine a degree of similarity (e.g., a semantic similarity score) relative to one or more search parameters associated with the search execution plan for each retrieved multimodal fragment to determine the top-k relevant multimodal fragments 122A-122N.

For example, the search orchestrator 116 may determine if a degree of similarity (e.g., a numerical value or the like) associated with a respective relevant multimodal fragment satisfies a relevance threshold (e.g., a numerical value or the like). The degree of similarity may satisfy the relevance threshold if the degree of similarity is greater than or equal to the relevance threshold (e.g., to within an error value of ±1%, ±5%, or any other number). In other examples, the degree of similarity (e.g., a numerical value or the like) may satisfy the relevance threshold (e.g., a numerical value or the like) if the degree of similarity is less than or equal to the relevance threshold (e.g., to within an error value of ±1%, ±5%, or any other number). In some examples, the top-k relevant multimodal fragments 122A-122N may comprise a predetermined number of retrieved multimodal fragments. For example, the top-k relevant multimodal fragments 122A-122N may be a set of one hundred (or any other suitable numerical value) relevant multimodal fragments 122A-122N. In other examples, there may be no minimum number of multimodal fragments comprised in the top-k relevant multimodal fragments 122A-122N. For example, only ten multimodal fragments may be associated with a degree of similarity that satisfies a predetermined relevance threshold. Once compiled, the search orchestrator 116 may be configured to send the top-k relevant multimodal fragments 122A-122N to the post-processor 124.

The post-processor 124 may be configured to generate a multimodal search result object 126 based on one or more relevant multimodal fragments 122A-122N (e.g., one or more of the top-k relevant multimodal fragments) retrieved based on the execution of a respective search execution plan (e.g., the search execution plan associated with the user search query "Explain the different types of rose"). In some examples, the post-processor 124 may generate the multimodal search result object 126 based on one or more predetermined constraints. For example, the post-processor 124 may ensure that any relevant multimodal fragments 122A-122N associated with a respective multimodal search result object 126 adhere to one or more predetermined constraints (e.g., LM constraints including or related to sensitivity constraints, bias constraints, enterprise guidelines, and/or the like). In this regard, if one or more relevant multimodal fragments 122A-122N (e.g., one or more of the top-k relevant multimodal fragments) violate one or more predetermined constraints (e.g., LM constraints), the post-processor 124 may be configured to remove, omit, and/or otherwise preclude the one or more relevant multimodal fragments 122A-122N that violate the one or more predetermined constraints from being included in the respective multimodal search result object 126.

Additionally, or alternatively, the post-processor 124 may be configured ensure that any relevant multimodal fragments 122A-122N associated with a respective multimodal search result object 126 adhere to one or more user device constraints associated with a respective user device (e.g., user device 128). For example, if the post-processor 124 determines that the respective user device (e.g., user device 128) does not have an electronic display (e.g., based on device attributes comprised in a corresponding multimodal search context 130), the post-processor 124 may disregard any relevant multimodal fragments 122A-122N configured as video and/or image fragments when generating the multimodal search result object 126 and utilize only multimodal fragments which the user device can process, access, and/or otherwise provide to the user.

Additionally, in some examples, the post-processor 124 may be configured to determine an appropriate configuration (e.g., layout, sequence, ordering, presentation, and/or the like) of a respective multimodal search result object 126. The post-processor 124 may generate the respective multimodal search result object 126 based on one or more user preferences and/or a subject matter associated with the user search query for which the corresponding relevant multimodal fragments 122A-122N were retrieved (e.g., based on the corresponding search execution plan associated with the user search query "Explain the different types of rose"). For example, the post-processor 124 may generate a respective multimodal search result object 126 based on a preferred multimodal fragment sequence of the user, where the preferred multimodal fragment sequence is determined based at least in part on a query formulation associated with the user search query associated with the corresponding search execution plan (e.g., a same or similar query formulation to "Explain the different types of x"). In some examples, the post-processor 124 may determine the configuration of the respective multimodal search result object 126 based on output received from the fragment representation engine 120. In some such examples, the fragment representation engine 120 may indicate a preferred ordering for one or more relevant multimodal fragments 122A-122N based on a ranking of the one or more relevant multimodal fragments 122A-122N. For example, in response to the query "Explain the different types of rose," the preferred multimodal fragment sequence of the user may be determined to be a first video fragment (e.g., describing various type of roses), followed by a series of images (e.g., illustrating how to identify various types of rose), followed by one or more portions of text related to the topic of the corresponding user search query (e.g., a portion of text describing various features of roses, how to categorize roses, and the details related to the various species of rose).

Additionally or alternatively, the post-processor 124 may generate a respective multimodal search result object 126 based on a preferred multimodal fragment modality type (e.g., a video modality, an image modality, and/or the like) of the user, where the preferred multimodal fragment modality type is determined based at least in part on the query formulation associated with the user search query associated with the corresponding search execution plan. In some examples, one or more of the preferred multimodal fragment sequence and/or the preferred multimodal fragment modality type of a respective multimodal search result object 126 may be generated based in part on a subject matter associated with the user search query associated with the corresponding search execution plan. Additionally, in some examples, the post-processor 124 may receive an indication of the preferred multimodal fragment modality type from the fragment representation engine 120.

As described herein, real-time feedback signals 132A-132N associated with a respective multimodal search result object 126 may be received by the user feedback engine 110. In some examples, the LM agent 114 may embody, integrate with, and/or otherwise leverage the user feedback engine 110 to facilitate the execution of one or more of the operations and/or techniques described herein. The user feedback engine 110 may be configured to store data related to the one or more real-time feedback signals 132A-132N along with the state of one or more components of the corresponding search execution plan in the feedback memory datastore 108. As described herein, one or more real-time feedback signals 132A-132N may correlate to a certain type of query formulation associated with a particular user search query and the multimodal search result object 126 generated with respect to the certain type of query formulation associated with a particular user search query.

In this regard, one or more real-time feedback signals 132A-132N may indicate that a user has reacted positively or negatively to one or more components of a respective multimodal search results object 126. For example, the user feedback engine 110 may attribute one or more real-time feedback signals 132A-132N to a respective multimodal fragment (e.g., relevant multimodal fragment 122A), a respective multimodal fragment modality type (e.g., videos, images, etc.), and/or a respective multimodal fragment sequence associated with a respective multimodal search result object 126. In some examples, one or more real-time feedback signals 132A-132N may be received from a user device (e.g., user device 128) based on a feedback prompt provided to the user device. For example, the user feedback engine 110 may be configured to generate a feedback prompt related to one or more components of a respective multimodal search result object 126. The feedback prompt may be configured to solicit feedback from a user related to one or more of a respective multimodal fragment (e.g., relevant multimodal fragment 122A), a respective multimodal fragment modality type (e.g., videos, images, etc.), and/or a respective multimodal fragment sequence provided based on a particular user search query.

In some examples, a feedback prompt may be configured as an audible prompt (e.g., a natural language question such as "Was this video relevant to your search about roses?") played via a loudspeaker comprised the user device (e.g., user device 128). In such an example, the feedback-based multimodal fragment retrieval system 100 may enter into an audio capturing mode (e.g., facilitated by a microphone of the user device) such that any audio data captured (ostensibly related to a user's response) can be analyzed by the user feedback engine 110 to determine one or more real-time feedback signals 132A-132N. In this regard, the user feedback engine 110 may be configured to extract various audio features from audio data associated with one or more real-time feedback signals 132A-132N received from a user device 128 in response to presentation of a respective multimodal search result object 126.

For example, the user feedback engine 110 may extract, identify, classify, and/or otherwise determine one or more portions of acoustic feature data (e.g., timbre, pitch, fluctuation pattern data), valence data (e.g., whether a portion of the audio data is related to a positive or negative emotion), arousal data (e.g., how excited or apathetic a user may be), dominance (e.g., how dominant or submissive a user may be), intensity data (e.g., volume data, gain data, etc.), intonation data, speech rate data, mel-frequency cepstral coefficient (MFCC) data, and/or the like from the audio data. The aforementioned audio features extracted from the audio data may be used by the user feedback engine 110 in order to identify one or more of an emotional state, a sentiment, an intent, an opinion, and/or the like of a user (e.g., user 140) related to one or more components of a respective multimodal search result object 126. As such, the user feedback engine 110 may be configured to infer one or more real-time feedback signals 132A-132N based on one or more of the emotional state, sentiment, intent, opinion, and/or the like of the user. For example, if the user feedback engine 110 causes provision of an audible feedback prompt to a respective user device (e.g., user device 128) and subsequently captures audio data related to a user response indicating the user is an adverse state (e.g., agitated, irritated, angry), the user feedback engine 110 may infer that the user has a negative opinion of one or more components of a corresponding multimodal search result object 126.

Additionally or alternatively, in some examples, a feedback prompt may be a visual prompt associated with one or more interactive user interface elements including, but not limited to thumbs up/down icons, star icons (e.g., five interactive star icons selectable by the user), buttons, sliders, text fields (e.g., configured to receive text input), and/or the like. In such examples, a user may be enabled to interact with the one or more interactive user interface elements associated with the feedback prompt in order to provide a user response indicating positive or negative feedback regarding one or more components of a respective multimodal search result object 126. In some such examples, a feedback prompt may comprise a text prompt soliciting a user's opinion regarding a specific component of a respective multimodal search result object 126 (e.g., "Was this video content relevant to your search about types of rose?", "Does the information in this graphic satisfactorily answer your question about roses?", "How would you rate this answer?").

In some examples, the user feedback engine 110 may be configured to generate a respective feedback prompt for a user (e.g., user 140) based on various user device capabilities (e.g., device attributes, hardware, firmware, software capabilities) of a user device (e.g., user device 128) related to the user. For example, if the user feedback engine 110 determines that a user device (e.g., user device 128) does not have an electronic display (e.g., based on a multimodal search context 130), the user feedback engine 110 will only provide audible feedback prompts to that user device. Alternatively, if the user feedback engine 110 determines that a user device (e.g., user device 128) has an electronic touch screen display (e.g., based on a multimodal search context 130), the user feedback engine 110 may provide both audible feedback prompts and visual feedback prompts to that user device. In this regard, one or more audible feedback prompts and/or visual feedback prompts may be provided to a user via a software application instance associated with the feedback-based multimodal fragment retrieval system 100 running on a respective user device (e.g., user device 128).

Furthermore, the user feedback engine 110 may be configured to classify one or more real-time feedback signals 132A-132N as implicit feedback signals or explicit feedback signals. Additionally, a feedback weight may be attributed to a respective real-time feedback signal (e.g., real-time feedback signal 132A). In some examples, a feedback weight may be a numerical value associated with a numerical range, where the numerical value indicates a positive user response, negative user response, or neutral user response (e.g., a decimal value range from −1.0 to 1.0, where −1.0 indicates a most negative response and 1.0 indicates a most positive response). The feedback weight associated with one or more respective real-time feedback signals 132A-132N may be aggregated or otherwise processed to determine a feedback state associated with a particular set of multimodal fragments (e.g., relevant multimodal fragments 122A-122N) of a respective multimodal search result object (e.g., multimodal search result object 126). As described herein, a feedback state associated with one or more multimodal fragments (e.g., relevant multimodal fragments 122A-122N) may be mapped to and/or otherwise associated with one or more previous search queries, previous search parameters associated with previously executed search execution plans generated based on the previous search queries, and/or previously retrieved relevant multimodal fragments retrieved based on the previously executed search execution plans in the feedback memory datastore 108.

As an example, an explicit feedback signal may be a respective real-time feedback signal (e.g., real-time feedback signal 132A) indicating a user response to a feedback prompt (e.g., a visual feedback prompt, an audible feedback prompt). For instance, an explicit feedback signal may be associated with a user interaction with one or more interactive user interface elements (e.g., a thumbs up/down icon) comprised in a respective feedback prompt. As another example, an explicit feedback signal may be a respective real-time feedback signal 132A associated with audio data associated with a user response to an audible feedback prompt soliciting user feedback related to a particular multimodal search result object 126 (e.g., "I did not like those search results," "Yes, thank you" "No", "One star," "Go away!"). Because explicit feedback signals are typically received at relatively low volumes (e.g., empirical research indicates that users often ignore or bypass direct feedback prompts), explicit feedback signals may be assigned a relatively high feedback weight by the user feedback engine 110 as compared to implicit feedback signals.

In some examples, implicit feedback signals may be real-time feedback signals 132A-132N that are associated with user engagement related to a respective multimodal search result object 126. In such examples, the user feedback engine 110 may determine various user engagement metrics associated with a respective multimodal search result object 126, where the user engagement metrics track various user interactions with various relevant multimodal fragments 122A-122N of the respective multimodal search result object 126 (e.g., interactions made with respect to a user interface associated with a software application instance related to the feedback-based multimodal fragment retrieval system 100). Examples of various types of user engagement may include a number of click-throughs (e.g., hyperlink click-throughs, image link click-throughs, video link click-throughs), an amount of time the user engaged with a respective relevant multimodal fragment (e.g., an amount of time the user watched a video associated with a respective multimodal search result object 126 (e.g., a video about roses)), and/or various other interactions (e.g., a zoom-in or zoom-out interaction with an image, table, and/or other graphic, an interaction with various interactive user interface elements associated with a respective multimodal search result object 126, and/or the like).

Implicit feedback signals are typically received at relatively high volumes and may be associated with noise (e.g., spurious user engagement data) making it difficult to accurately infer whether a respective implicit signal actually indicates a positive or negative response of the user. For instance, a user (e.g., user 140) may access a video link associated with a respective multimodal search result object 126 and walk away as the video plays on the respective user device (e.g., user device 128). In such an example, the user feedback engine 110 may log a respective real-time feedback signal 132A associated with a user engagement metric related to the amount time the video played, which may indicate that a user has ostensibly watched the video to completion (thus indicating the user enjoyed the content and multimodal fragment modality type) even though the user walked away without engaging the video. As such, the user feedback engine 110 may assign a relatively low feedback weight to implicit feedback signals as compared to implicit feedback signals.

Additionally, in some examples, the LM agent 114 of the feedback-based multimodal fragment retrieval system 100 may be configured determine, based in part on a set of real-time feedback signals 132A-132N, a misinformation signal indicating misinformation associated with one or more relevant multimodal fragments 122A-122N comprised in a respective multimodal search result object 126. For instance, users that encounter false or misleading information in one or more relevant multimodal fragments 122A-122N may provide negative feedback signals (e.g., explicit feedback signals indicating a negative response). In such examples, the LM agent 114 may be configured to update, based on the misinformation signal, one or more of the feedback memory datastore 108, the fragment signals datastore 106, and/or one or more candidate retrieval sources 112A-112N in order to correct, update, or remove the misinformation associated with the one or more relevant multimodal fragments 122A-122N comprised in the respective multimodal search result object 126.

In some examples, when a respective feedback-based multimodal fragment retrieval system 100 is in nascent stages, an automated feedback provider 138 may be leveraged to "bootstrap" (e.g., initialize, populate) the feedback memory datastore 108. In some examples, the automated feedback provider 138 may be an LM-based "judge" configured to receive, retrieved, ingest, and/or otherwise access example multimodal search result objects comprising relevant multimodal fragments 122A-122N generated by the feedback-based multimodal fragment retrieval system 100 based on known search queries (e.g., known questions, known prompts, known commands). The automated feedback provider 138 may be configured to generate feedback signals that approximate human judgement based on the example multimodal search result objects. The example multimodal search result objects and corresponding feedback signals generated by the automated feedback provider 138 are stored in the feedback memory datastore 108. In some examples, training runs are executed such that search execution plans are generated by the LM agent 114 based on the example multimodal search result objects and corresponding feedback signals. As more feedback signals are generated by the automated feedback provider 138, the LM agent 114 learns to generate search execution plans that produce expected, acceptable results (e.g., search execution plans whose corresponding example multimodal search result objects produce positive feedback signals). In this manner, the training runs are executed until a convergence is reached and the respective feedback-based multimodal fragment retrieval system 100 is configured to interact with one or more users.

Figure 2A:
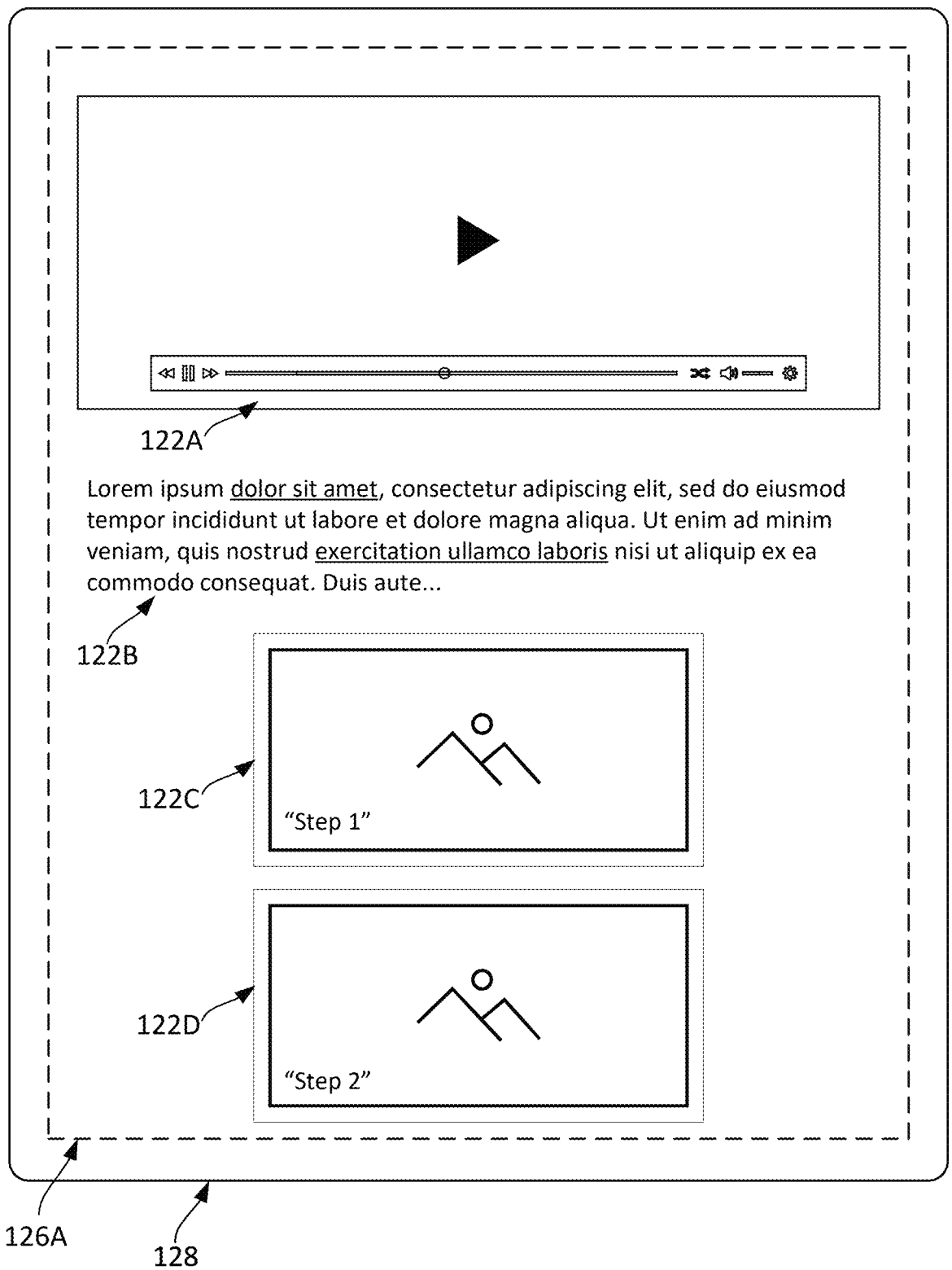
FIG. 2A illustrates an example multimodal search result object, according to various embodiments of the present disclosure.

FIG. 2A illustrates an example multimodal search result object 126A rendered on a user interface associated with a user device 128, according to various examples of the present disclosure. As illustrated, the multimodal search result object 126A is associated with a particular multimodal fragment sequence, where the particular multimodal fragment sequence correlates to a first relevant multimodal fragment 122A configured as a video, a second relevant multimodal fragment 122B configured as a portion of text, a third relevant multimodal fragment 122C configured as a first image, and a fourth relevant multimodal fragment 122D configured as a second image. As described herein, the post-processor 124 may generate a respective multimodal search result object (e.g., multimodal search result object 126A) based on a preferred multimodal fragment sequence of the user, where the preferred multimodal fragment sequence is determined based at least in part on a query formulation associated with the user search query associated with the corresponding search execution plan. As described herein, in some examples, the preferred multimodal fragment sequence may be indicated to the post-processor 124 by the fragment representation engine 120.

For example, the multimodal fragment sequence correlating to the multimodal search result object 126A may be a preferred multimodal fragment sequence associated with a query formulation such as "How do I xyz . . . " or "How to xyz . . . " (e.g., "How do I make a sourdough bread starter?"). In such an example, the LM agent 114 may have inferred, based on data comprised in the feedback memory datastore 108, that the respective user (e.g., user 140) prefers video content followed by explanatory text and images depicting step-by-step instructions when the user makes queries related to learning a new skill or when requesting instructions on how to do something. As shown, the second relevant multimodal fragment 122B configured as a portion of text may comprise one or more interactive user interface elements (e.g., hyperlinks) that the user may access based on a selection indication (e.g., a finger press). Similarly, in some examples, the third relevant multimodal fragment 122C configured as the first image, and the fourth relevant multimodal fragment 122D configured as the second image may be interactive (e.g., link to an external website, zoomable).

Figure 2B:
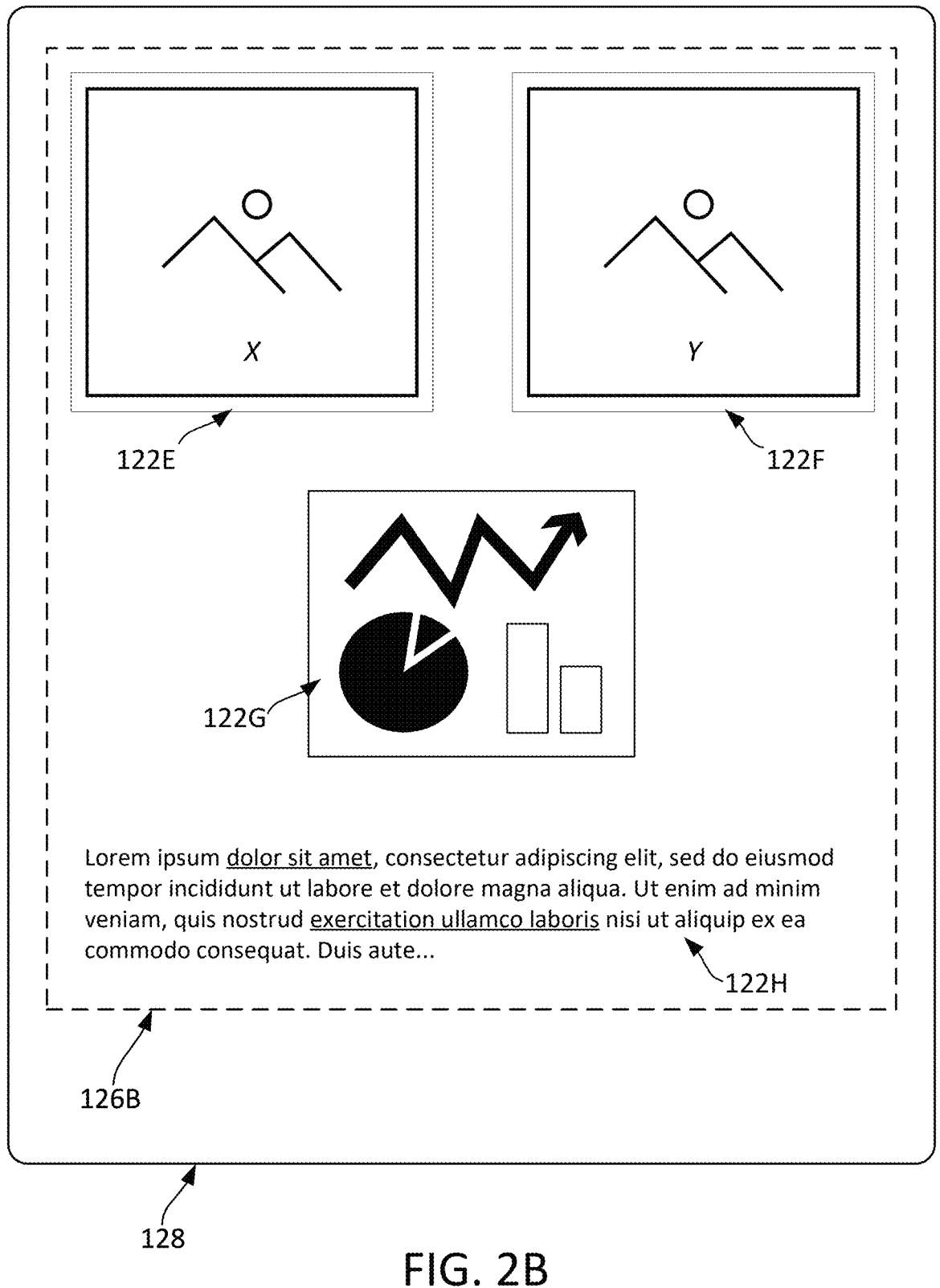
FIG. 2B illustrates another example multimodal search result object, in accordance with various aspects of the present disclosure.

FIG. 2B illustrates an example multimodal search result object 126B rendered on a user interface associated with a user device 128, according to various examples of the present disclosure. As illustrated, the multimodal search result object 126B is associated with a particular multimodal fragment sequence, where the particular multimodal fragment sequence correlates to a first relevant multimodal fragment 122E configured as a first image, a second relevant multimodal fragment 122F configured as a second image, a third relevant multimodal fragment 122G configured as visual graphic illustrating various statistics (e.g., charts, tables, graphs related to the subject matter), and a fourth relevant multimodal fragment 122H configured as a portion of text. As described herein, the post-processor 124 may generate a respective multimodal search result object (e.g., multimodal search result object 126B) based on a preferred multimodal fragment sequence of the user, where the preferred multimodal fragment sequence is determined based at least in part on a query formulation associated with the user search query associated with the corresponding search execution plan. As described herein, in some examples, the preferred multimodal fragment sequence may be indicated to the post-processor 124 by the fragment representation engine 120.

For example, the multimodal fragment sequence correlating to the multimodal search result object 126D may be a preferred multimodal fragment sequence associated with a query formulation such as "What is the difference between x and y?" (e.g., "What is the difference between dogs and wolves?"). In such an example, the LM agent 114 may have inferred, based on data comprised in the feedback memory datastore 108, that the respective user (e.g., user 140) prefers to view side-by-side image comparisons of the subjects of the corresponding user search query (e.g., dogs and wolves). Additionally, based on various real-time feedback signals stored in the feedback memory datastore 108, the LM agent 114 may infer that the user prefers statistical visualizations (e.g., tables, charts, graphs) describing statistical data related to the user search query followed by one or more portions of descriptive text when requesting information comparing multiple subjects.

As shown, the first relevant multimodal fragment 122E configured as the first image, and the second relevant multimodal fragment 122F configured as the second image may be interactive (e.g., link to an external website, zoomable). Additionally or alternatively, the third relevant multimodal fragment 122G configured as the visual graphic illustrating various statistics (e.g., charts, tables, graphs related to the subject matter) may be interactive (e.g., expandable, searchable, configurable (e.g., to hide specific information), and/or the like). Similarly, in some examples, the fourth relevant multimodal fragment 122H configured as a portion of text may comprise one or more interactive user interface elements (e.g., hyperlinks) that the user may access based on a selection indication (e.g., a finger press).

Figure 2C:
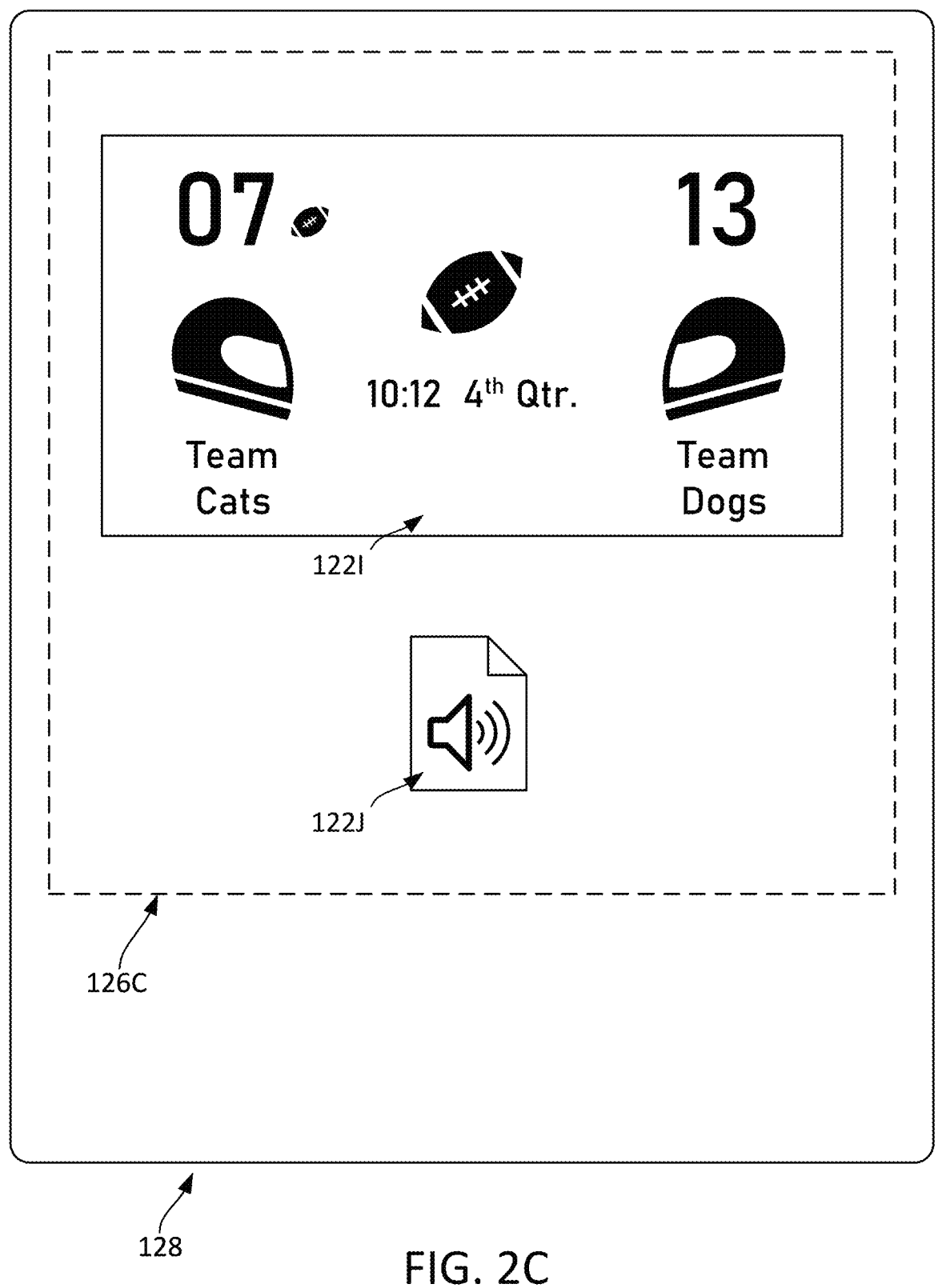
FIG. 2C illustrates another example multimodal search result object, in accordance with various aspects of the present disclosure.

FIG. 2C illustrates an example multimodal search result object 126C rendered on a user interface associated with a user device 128, according to various examples of the present disclosure. As illustrated, the multimodal search result object 126C is associated with a particular multimodal fragment modality type, where the particular multimodal fragment modality type correlates to a first relevant multimodal fragment 122I configured as a visual graphic (e.g., animated graphic, infographic, static graphic) associated with an electronic data object associated with the current score of a sporting event. As described herein, the post-processor 124 may generate a respective multimodal search result object (e.g., multimodal search result object 126B) based on a preferred multimodal fragment modality type of the user, where the preferred multimodal fragment modality type is determined based at least in part on a query formulation associated with the user search query associated with the corresponding search execution plan. As described herein, in some examples, the preferred multimodal fragment sequence may be indicated to the post-processor 124 by the fragment representation engine 120.

For example, the multimodal fragment sequence correlating to the multimodal search result object 126D may be a preferred multimodal fragment sequence associated with a query formulation such as "What is the score of the Dogs and Cats game?". In such an example, the LM agent 114 may have inferred, based on data comprised in the feedback memory datastore 108, that the respective user (e.g., user 140) prefers a simple, easy-to-read infographic, visual graphic, and/or the like comprising only the pertinent information (e.g., current score, time remaining in a match, team possession of the sports ball, and/or the like) when inquiring about live sporting events.

As shown, in some examples, the first relevant multimodal fragment 122I configured as the visual graphic illustrating various pertinent information related to the sporting event may be interactive (e.g., selectable, expandable, searchable, configurable (e.g., to hide specific information), and/or the like). As such, if the user desires additional information beyond the pertinent information of the live sporting event, the user may engage the visual graphic to access more information, external links, and/or multimedia (e.g., video clips) related to the live sporting event. Additionally or alternatively, as shown, the multimodal search result object 126C may comprise a second relevant multimodal fragment 122J configured as an audio file, where the audio file may comprise audio data pertaining to the pertinent information of the live sporting event that plays automatically once the user device 128 renders the multimodal search result object 126C.

Figure 3:
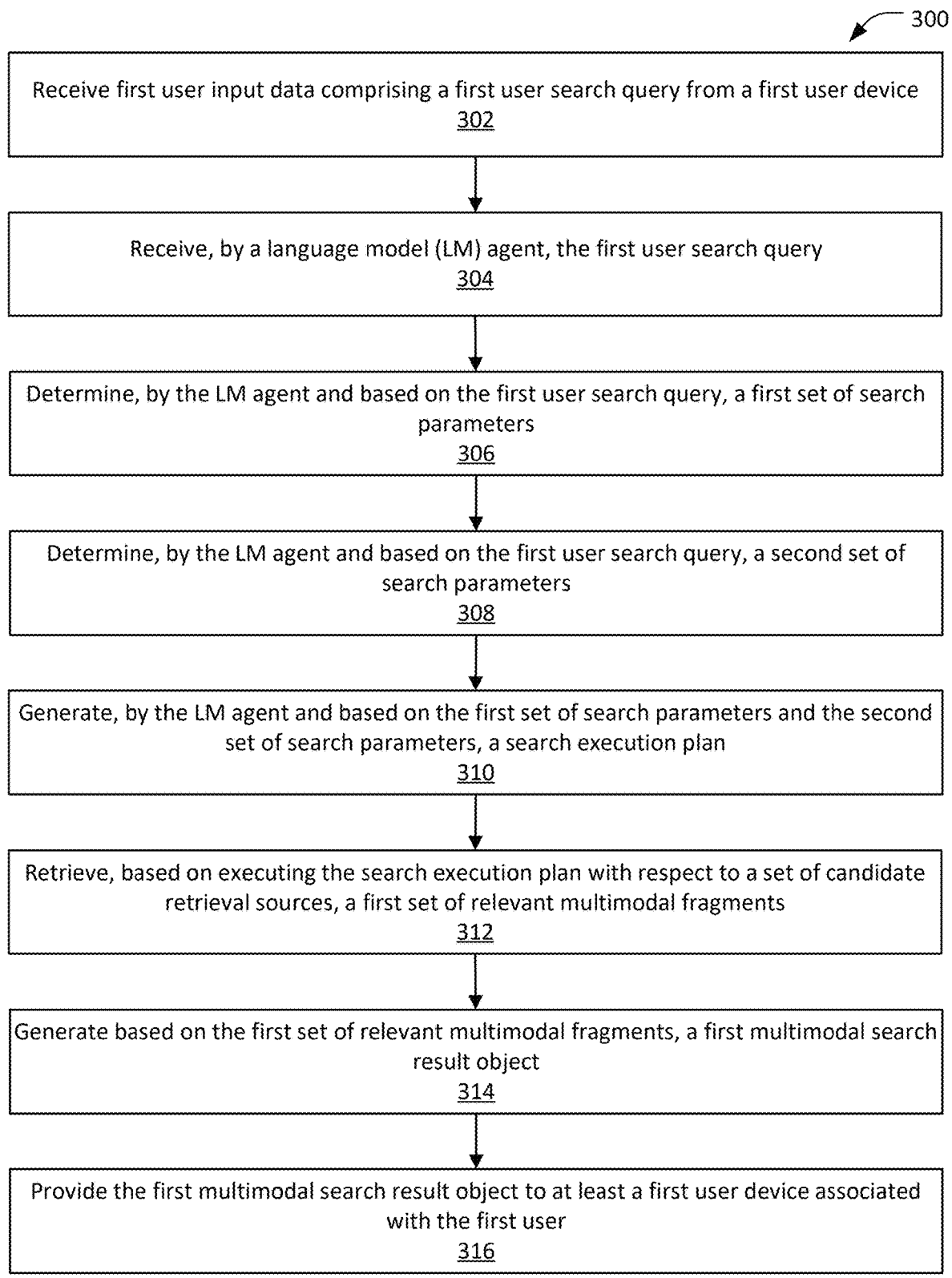
FIG. 3 is a flowchart illustrating an example process for feedback-based multimodal fragment retrieval, in accordance with embodiments of the present disclosure.

FIG. 3 is a flow chart illustrating an example process 300 for feedback-based multimodal fragment retrieval, in accordance with examples of the present disclosure. The process 300 of FIG. 3 may be executed by one or more computing devices. The actions of process 300 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 300 may be described above with reference to elements of FIG. 1 and FIGS. 2A-2C. Although shown in a particular order, the steps of process 300 may instead be performed in a different order. Additionally, various steps may be performed in parallel in various implementations. Further, some steps may be omitted and/or other steps may be added in accordance with the feedback-based multimodal fragment retrieval techniques described herein.

The process 300 may begin at operation 302, at which a search orchestrator (e.g., search orchestrator 116) is configured to receive first user input data (e.g., user input data 136) comprising a first user search query from a first user device (e.g., user device 128) associated with a first user (e.g., user 140). As described herein, the first user input data (e.g., user input data 136) may be audio data (e.g., utterances, natural language requests, human speech) associated with the first user search query (e.g., a request, command, instruction) for which a user (e.g., user 140) expects various multimodal fragment data in response. Additionally or alternatively, the first user input data (e.g., user input data 136) may be text data and/or selection data (e.g., user interface interaction data) associated with the first user search query. In some examples, the first user input data (e.g., user input data 136) may be associated with a multimodal search context (e.g., multimodal search context 130).

Processing may continue at operation 304, at which an LM agent (e.g., LM agent 114) is configured to receive the first user search query.

Processing may continue at operation 306, at which the LM agent (e.g., LM agent 114) is configured to determine, based on the first user search query, a first set of search parameters. In some examples, the first set of search parameters are associated with semantic search data (e.g., recall parameters, text strings and/or substrings, query formulations, tokenized words, search terms, and/or the like) that are configured to be used in various search operations (e.g., semantic search operations) executed by a search orchestrator (e.g., search orchestrator 116) with respect to a particular candidate retrieval source (e.g., candidate retrieval source 112C configured as an evergreen document index). Additionally, the first set of search parameters may correspond to a common subject matter, knowledge domain, multimodal fragment modality type, and/or the like.

In some examples, determining the first set of search parameters comprises executing one or more of a memory retention plan and/or an exploration plan with respect to a feedback memory datastore (e.g., feedback memory datastore 108), where the first set of search parameters is determined based on a feedback state associated with a first set of previously retrieved relevant multimodal fragments related to a first previous user search query stored in the feedback memory datastore.

As described herein, the feedback memory datastore (e.g., feedback memory datastore 108) may be configured as a deep semantic index comprising data related to previous user search queries, previous search parameters associated with previously executed search execution plans generated based on the previous search queries, previously retrieved relevant multimodal fragments retrieved based on the previously executed search execution plans, and/or feedback states associated with the previously retrieved relevant multimodal fragments. In some examples, the feedback state is generated based on one or more real-time feedback signals (e.g., real-time feedback signals 132A-132N) received from a user (e.g., user 140) and may be positive or negative. The various data comprised in the feedback memory datastore (e.g., feedback memory datastore 108) may be tokenized, indexed, and semantically represented by respective embeddings (e.g., multidimensional numerical representations that convey the meaning and/or context of the various data).

In this regard, once the LM agent (e.g., LM agent 114) receives the first user search query, the LM agent (e.g., LM agent 114) may perform a semantic search in the feedback memory datastore (e.g., feedback memory datastore 108) to identify and/or retrieve one or more past user search queries (e.g., previous utterances, previous text-based queries) that are similar to the first user search query. In some such examples, the LM agent (e.g., LM agent 114) may be configured to initiate and/or execute one or more API calls configured to perform one or more semantic search operations with respect to the feedback memory datastore (e.g., feedback memory datastore 108) based on the first user search query.

For example, the LM agent (e.g., LM agent 114) may be configured to transform the first user search query into a set of query embeddings (e.g., vectorized embeddings) and compare (e.g., via one or more API calls) the set of query embeddings to various stored embeddings associated with past successful user search queries and/or previously retrieved multimodal fragment result objects (e.g., similar past user search queries and/or previously retrieved multimodal fragment result objects associated with positive feedback signals) comprised in the feedback memory datastore (e.g. feedback memory datastore 108). In some examples, such a comparison may be part of a nearest-neighbor algorithm executed by the LM agent 114, where the nearest-neighbor algorithm is configured to determine which of the past successful user search queries and/or previously retrieved multimodal fragment result objects are most similar (and/or relevant) to the first user search query (e.g., which past successful search queries have a same or similar query formulation as the first user search query and/or are associated with positive user feedback). As such, in some examples, the LM agent (e.g., LM agent 114) may determine the first set of search parameters for the first user search query based on previously executed search parameters comprised in a previously executed search execution plan associated with the most similar past successful user search queries and/or previously retrieved multimodal fragment result objects.

Additionally or alternatively, as described herein, the LM agent (e.g., LM agent 114) may be configured to utilize various in-context learning techniques to derive one or more search parameters to execute with respect to the first user search query. For example, the LM agent (e.g., LM agent 114) may be configured to use one or more of the various stored embeddings associated with past successful user search queries and/or previously retrieved multimodal fragment result objects (e.g., similar past user search queries and/or previously retrieved multimodal fragment result objects associated with positive feedback signals) comprised in the feedback memory datastore (e.g. feedback memory datastore 108) as in-context example input (also known as few-shot examples or few-shot prompts) and corresponding past search parameters as in-context example output. In some examples, only the most relevant past user search queries (e.g., as determined via the execution of a nearest neighbor algorithm) may be used as in-context example input. Once primed with the in-context example input and in-context example output, the LM agent (e.g., LM agent 114) may be configured to determine search parameters associated with the first user search query by using the first user search query as an input prompt. Based on the input prompt associated with the first user search query, the LM agent (e.g., LM agent 114) may generate the first set of search parameters.

In some examples, executing the memory retention plan comprises determining, based on a first query formulation associated with the first user search query, a preferred multimodal fragment sequence of the first user. Additionally or alternatively, in some examples, executing the memory retention plan comprises determining, based on a first query formulation associated with the first user search query, a preferred multimodal fragment modality type of the first user. Additionally or alternatively, in some examples, executing the memory retention plan comprises determining a subject matter associated with the first user search query.

In this regard, the first user search query may be associated with a first query formulation such as "What is the difference between x and y," where x and y are distinct yet similar objects, organisms, topics, categories, subjects, items, ideas, and/or the like (e.g., determinism and free will). In such an example, a user may have been presented with relevant multimodal fragments (e.g., relevant multimodal fragments 122A-122N) configured as a side-by-side table with images of x and y, along with key information (e.g., textual information) defining x and y, as well as a list of the key differences in the key information. Additionally, the relevant multimodal fragments (e.g., relevant multimodal fragments 122A-122N) may have been comprised in a respective multimodal search result object (e.g., multimodal search result object 126) in a particular multimodal fragment sequence (e.g., a particular ordering of multimodal fragments). In this example, a user feedback engine (e.g., user feedback engine 110) may have received one or more real-time feedback signals (e.g., real-time feedback signals 132A-132N) indicating positive feedback from the first user (e.g., user 140) in response to the relevant multimodal fragments (e.g., relevant multimodal fragments 122A-122N).

By way of continued example, the first user (e.g., user 140) may have, at a different time, submitted a second user search query (e.g., a different utterance) associated with a similar query formulation as the first query formulation, such as "What is the main difference between a w and a z", where w and z are also distinct yet similar objects, organisms, topics, categories, subjects, items, ideas, and/or the like (e.g., a dog and a wolf). In this example, the first user may have been presented with a respective multimodal search result object 126 comprising a relevant multimodal fragment configured as a single, short piece of text indicating the main difference between w and z with no other accompanying multimodal fragments. In this example, the relevant multimodal fragment may have received one or more real-time feedback signals (e.g., real-time feedback signals 132A-132N) indicating negative feedback from the first user (e.g., user 140).

In this regard, based on the real-time feedback signals (e.g., real-time feedback signals 132A-132N) received from the first user based on the respective multimodal search result objects provided based on the first and second user search queries, the LM agent (e.g., LM agent 114) may determine (e.g., infer) that the user prefers one or more of a particular multimodal fragment modality type and/or a particular multimodal fragment sequence in response to a user search query associated with a particular query formulation (e.g., "What is the difference between x and y?"). As such, the LM agent (e.g., LM agent 114) may leverage the memory retention plan to determine various search parameters for a respective user search query based on the feedback associated with previous user search queries.

In this regard, in some examples, the memory retention plan comprises determining, based on a particular query formulation associated with a user search query, a preferred multimodal fragment sequence of the first user, where a corresponding multimodal search result object may be generated based in part on the preferred multimodal fragment sequence. For example, the LM agent (e.g., LM agent 114) may determine, based on feedback data comprised in the feedback memory datastore (e.g., feedback memory datastore 108), that a user prefers a particular sequence (e.g., ordering) of multimodal fragment modality types for certain types of user search queries (e.g., a first video, then a first portion of text, followed by a series of informational images).

Additionally or alternatively, in some examples, the memory retention plan comprises determining, based on a particular query formulation associated with respective user search query, a preferred multimodal fragment modality type of the first user, where a corresponding multimodal search result object may be generated based in part on the preferred multimodal fragment modality type (e.g., a user may prefer video fragments over long-form text fragments). Additionally or alternatively, in some examples, the memory retention plan comprises determining a subject matter associated with a particular user search query, where one or more of a preferred multimodal fragment sequence and/or a preferred multimodal fragment modality type of a corresponding multimodal search result object (e.g., multimodal search result object 126) are generated based in part on the subject matter.

In addition to (or in lieu of) employing the memory retention plan, the LM agent (e.g., LM agent 114) may be configured to employ the exploration plan. The exploration plan may be configured to determine which possible new search parameters may be possible and/or relevant to the user based on a respective user search query (e.g., the first user search query). The exploration plan may be used as reinforcement learning for the LM agent (e.g., LM agent 114) in that the exploration plan utilizes a form of trial and error to solicit real-time feedback signals (e.g., real-time feedback signals 132A-132N) based on the provision of various multimodal fragments.

For example, when the feedback-based multimodal fragment retrieval system 100 is in nascent stages and the amount of feedback signals associated with a respective user is low, the LM agent (e.g., LM agent 114) may prioritize the user of the exploration plan to generate search parameters for a respective search execution plan. For instance, the LM agent (e.g., LM agent 114) may utilize the exploration plan until the memory retention plan obtains a predetermined feedback rate value (e.g., a numerical value associated with a 70% positive feedback rate, or any other suitable feedback rate). In some examples, the feedback rate associated with the memory retention plan may be used by the LM agent (e.g., LM agent 114) to determine a confidence score associated with the memory retention plan. In such examples, a numerical value associated with the confidence score may indicate a degree of confidence that the memory retention plan will generate search parameters and/or search execution plans that will result in positive feedback signals (e.g., real-time feedback signals 132A-132N) from the first user. In this regard, the LM agent (e.g., LM agent 114) may be configured to determine when to employ the memory retention plan or the exploration plan.

Processing may continue at operation 308, at which the LM agent (e.g., LM agent 114) is configured to determine, based on the first user search query, a second set of search parameters. In some examples, determining the second set of search parameters comprises executing an evolving trend identification plan with respect to a fragment signals datastore (e.g., fragment signals datastore 106) to determine first trend data, where the second set of search parameters is determined based on a set of contextual fragment data comprising at least the first trend data, where the set of contextual fragment data is stored in the fragment signals datastore. In some examples, the set of contextual fragment data comprises a set of previous external user search queries generated by one or more external users, where the set of previous external user search queries are associated with one or more of trending topics, trending news items, or trending events. Additionally, in some examples, the set of contextual fragment data comprises a set of previously retrieved multimodal fragments retrieved based on the set of previous external user search queries.

Based on such contextual fragment data, the evolving trend identification plan may be configured to identify various trends and/or current news cycles that may be relevant to a user search query. For example, in the case of the user search query "Explain the different types of rose," the evolving trend identification plan may be employed to determine whether "rose" is a new trend in entertainment or whether a new type of rose has been discovered. As such, the intent of the evolving trend identification plan is to understand and include novel topics when executing a respective search execution plan. In this regard, any relevant trends, topics, news items, current events, and/or the like may be used to determine search parameters accordingly, as well as adapt to out-of-distribution user search queries (e.g., out-of-distribution utterances).

Furthermore, in some examples, the set of contextual fragment data stored in the fragment signals datastore (e.g., fragment signals datastore 106) is associated with a predetermined time window, where the set of previous external user search queries and the set of previously retrieved multimodal fragments are associated with frequency data. In such examples, the frequency data may indicate a number of times one or more previous external user search queries of the set of previous external user search queries have been received during the predetermined time window and/or a number of times one or more previously retrieved multimodal fragments of the set of previously retrieved multimodal fragments have been retrieved during the predetermined time window.

In this regard, the frequency data related to the previous external user search queries and/or the previously retrieved multimodal fragments may be used to determine a "frequency curve" of certain search query terms and/or multimodal fragments related to respective trends, topics, news items, current events, and/or the like during the predetermined time window. For example, the frequency curve associated with a respective search query term may indicate whether a topic related to the respective search query term is trending, and therefore potentially temporally relevant to a user. Similarly, the frequency curve associated with a respective multimodal fragment may indicate how many times the respective multimodal fragment has been returned to one or more users based on the execution of various search execution plans during the predetermined time window. In some examples, a numerical value associated with the frequency curve of a respective search query term and/or multimodal fragment may be compared to a frequency curve threshold to determine whether a respective trend, topic, news item, current event, and/or the like associated with the respective search query term and/or multimodal fragment is currently trending and therefore potentially temporally relevant to a user.

In some examples, the frequency curve associated with certain search query terms and/or multimodal fragments related to respective trends, topics, news items, current events, and/or the like may be locally relevant to the user (e.g., based on a current geolocation of the user) and/or nationally relevant. As such, the LM agent 114 may be configured to utilize location data associated with the user (e.g., as indicated by a corresponding multimodal search context 130) to determine whether various respective trends, topics, news items, current events, and/or the like may be locally relevant to user.

Processing may continue at operation 310, at which the LM agent (e.g., LM agent 114) is configured to generate, based on the first set of search parameters and the second set of search parameters, a search execution plan. Processing may continue at operation 312, at which the search orchestrator (e.g., search orchestrator 116) is configured to retrieve, based on executing the search execution plan with respect to a set of candidate retrieval sources (e.g., candidate retrieval sources 112A-112N), a first set of relevant multimodal fragments (e.g., relevant multimodal fragments 122A-122N). As described herein, one or more relevant multimodal fragments of the first set of relevant multimodal fragments may be retrieved by the search orchestrator (e.g., search orchestrator 116) according to a set of predetermined constraints.

Processing may continue at operation 314, at which the post-processor (e.g., post-processor 124) is configured to generate, based on the first set of relevant multimodal fragments, a first multimodal search result object (e.g., multimodal search result object 126). In some examples, the first multimodal search result object (e.g., multimodal search result object 126) comprises at least a subset of the first set of relevant multimodal fragments, where the subset of the first set of relevant multimodal fragments is determined based in part on the multimodal search context (e.g., multimodal search context 130).

In some examples, the first multimodal search result object (e.g., multimodal search result object 126) may be generated based in part on the preferred multimodal fragment sequence. Additionally or alternatively, in some examples, the first multimodal search result object may be generated based in part on the preferred multimodal fragment modality type. In some examples, one or more of the preferred multimodal fragment sequence or the preferred multimodal fragment modality type of the first multimodal search result object are generated based in part on the subject matter associated with the first user search query. In some examples, one or more of the preferred multimodal fragment sequence or the preferred multimodal fragment modality type of the first multimodal search result object are indicated by the fragment representation engine 120.

As described herein, in some examples, the search orchestrator (e.g., search orchestrator 116) may be configured to determining, based on the multimodal search context (e.g., multimodal search context 130), one or more user device attributes associated with the first user device (e.g., user device 128) utilized to generate the first user input data. In such examples, the post-processor (e.g., post-processor 124) may be configured to determine, based on the user device attributes, whether one or more relevant multimodal fragments of the first set of relevant multimodal fragments are accessible by the first user device.

Processing may continue at operation 316, at which the post-processor (e.g., post-processor 124) is configured to provide the first multimodal search result object (e.g., multimodal search result object 126) to at least a first user device (e.g., user device 128) associated with the first user (e.g., user 140). Furthermore, as described herein, in some embodiments, a user feedback engine (e.g., user feedback engine 110) may be configured to receive, from the first user device, a set of real-time feedback signals (e.g., real-time feedback signals 132A-132N) associated with the first user, where the set of real-time feedback signals is generated in response receiving the first multimodal search result object. In some examples, the user feedback engine (e.g., user feedback engine 110) may be configured to store one or more of the first user input data, the first set of search parameters, the second set of search parameters, the search execution plan, the first multimodal search result object (e.g., multimodal search result object 126), and/or the set of real-time feedback signals (e.g., real-time feedback signals 132A-132N) in the feedback memory datastore (e.g., feedback memory datastore 108).

As described herein, in some examples, the feedback memory datastore (e.g., feedback memory datastore 108) comprises a multimodal search result feedback map associated with the memory retention plan. In some such examples, generating the multimodal search result feedback map comprises mapping at least a first previous user search query to one or more of a first set of previous search parameters associated with a first previously executed search execution plan, a first set of previously retrieved relevant multimodal fragments retrieved based on the first previously executed search execution plan, and a first feedback state associated with the first set of previously retrieved relevant multimodal fragments, wherein the first feedback state is generated based on one or more real-time feedback signals received from the first user.

Figure 4:
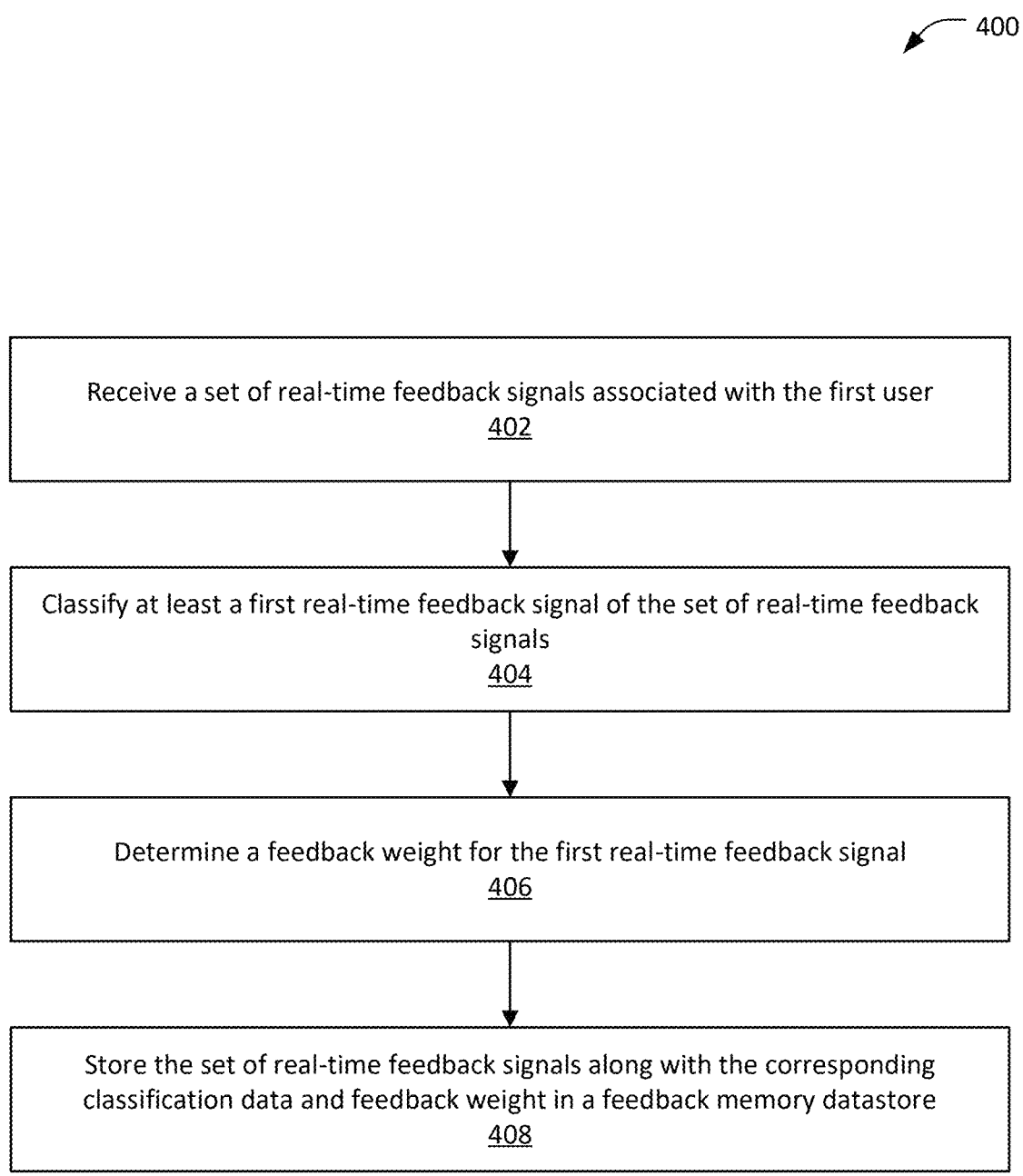
FIG. 4 is a flowchart illustrating an example process for classifying real-time feedback signals associated with a user, in accordance with embodiments of the present disclosure.

FIG. 4 is a flowchart illustrating an example process 400 for classifying real-time feedback signals, in accordance with examples of the present disclosure. The process 400 of FIG. 4 may be executed by one or more computing devices. The actions of process 400 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 400 may be described above with reference to elements of FIG. 1, FIGS. 2A-2C, and FIG. 3. Although shown in a particular order, the steps of process 400 may instead be performed in a different order. Additionally, various steps may be performed in parallel in various implementations. Further, some steps may be omitted and/or other steps may be added in accordance with the real-time feedback signal classification techniques described herein.

The process 400 may begin at operation 402, at which a user feedback engine (e.g., user feedback engine 110) is configured to receive a set of real-time feedback signals (e.g., real-time feedback signals 132A-132N) associated with the first user (e.g., user 140).

Processing may continue at operation 404, at which the user feedback engine (e.g., user feedback engine 110) is configured to classify at least a first real-time feedback signal of the set of real-time feedback signals (real-time feedback signals 132A-132N). As described herein, the user feedback engine may be configured to classify the first real-time feedback signal of the set of real-time feedback signals as one of an implicit feedback signal or an explicit feedback signal.

In some examples, the user feedback engine (e.g., user feedback engine 110) may be configured to provide a feedback prompt associated with a first multimodal search result object to the first user via a first user device (e.g., user device 128) associated with the first user. In such examples, classifying the first real-time feedback signal as an explicit feedback signal may comprise receiving at least a first user response to the feedback prompt, where the feedback weight for the first real-time feedback signal is determined based in part on the first user response. In some such examples, the feedback prompt may be generated based at least in part on one or more user device attributes associated with the first user device (e.g., user device 128). Additionally or alternatively, in some examples, classifying the first real-time feedback signal as an implicit feedback signal may comprise determining various user engagement with one or more relevant multimodal search results (e.g., relevant multimodal search results 122A-122N) associated with a first multimodal search result object (e.g., multimodal search result object 126), where the feedback weight for the first real-time feedback signal may be determined based in part on the user engagement.

Processing may continue at operation 406, at which the user feedback engine (e.g., user feedback engine 110) is configured to determine a feedback weight for the first real-time feedback signal. As described herein, the feedback weight may indicate one of positive user feedback or negative user feedback related to a first multimodal search result object (e.g., multimodal search result object 126) generated as a result of executing a first search execution plan related to a first user search query.

Processing may continue at operation 408, at which the user feedback engine (e.g., user feedback engine 110) is configured to store the set of real-time feedback signals 132A-132N along with the corresponding classification data and feedback weight in the feedback memory datastore 108.

Figure 5:
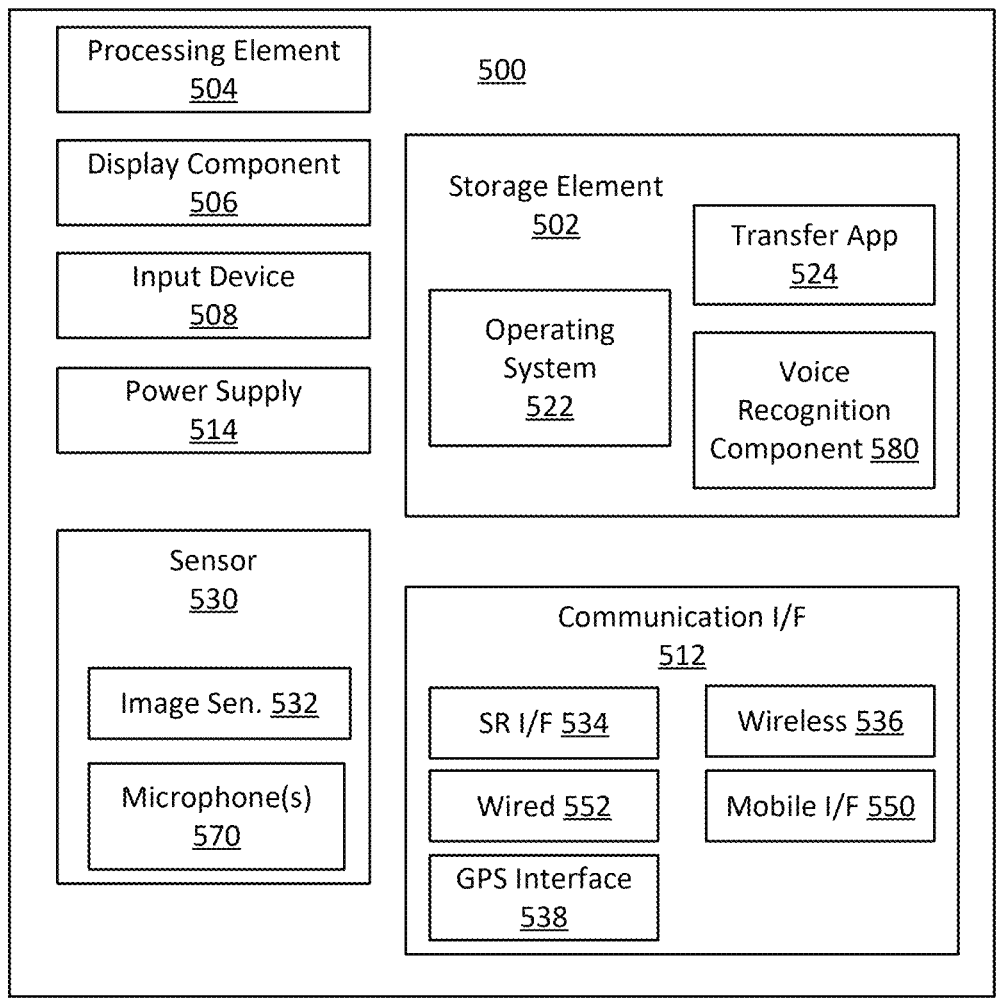
FIG. 5 is a block diagram showing an example architecture of a user device that may be used in accordance with various embodiments described herein.

FIG. 5 is a block diagram showing an example architecture 500 of a user device (e.g., a user device 128 such as a natural language processing-enabled device or another computing device) that may be used to implement, at least in part, a natural language processing-enable device configured to receive spoken and/or other natural input commands, in accordance with various aspects of the present disclosure. It will be appreciated that not all devices will include all of the components of the architecture 500 and some user devices may include additional components not shown in the architecture 500 The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). In some examples, the processing element 504 may be effective to determine a wakeword and/or to stream audio data to a multimodal fragment retrieval system. The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. In various examples, the storage element 502 may comprise one or more components of the feedback-based multimodal fragment retrieval system 100.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500. In some examples, the transfer application 524 may also be configured to send the received voice requests to one or more voice recognition servers.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors, or other types of display devices, etc. As described herein, display component 506 may be effective to display content determined provided by a skill executed by the processing element 504 and/or by another computing device.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. Voice recognition component 580 may interpret audio signals of sound captured by microphone 570. In some examples, voice recognition component 580 may listen for a wakeword to be received by microphone 570. Upon receipt of the wakeword, voice recognition component 580 may stream audio to a voice recognition server for analysis, such as a multimodal fragment retrieval system. In various examples, voice recognition component 580 may stream audio to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as a computer communication network, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 550 may be configured to communicate utilizing a cellular or other mobile protocol. A GPS interface 538 may be in communication with one or more earth-orbiting satellites or other suitable position-determining systems to identify a position of the architecture 500. A wired communication module 552 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. An example of an image sensor 532 may be a camera configured to capture color information, image geometry information, and/or ambient light information.

Figure 6:
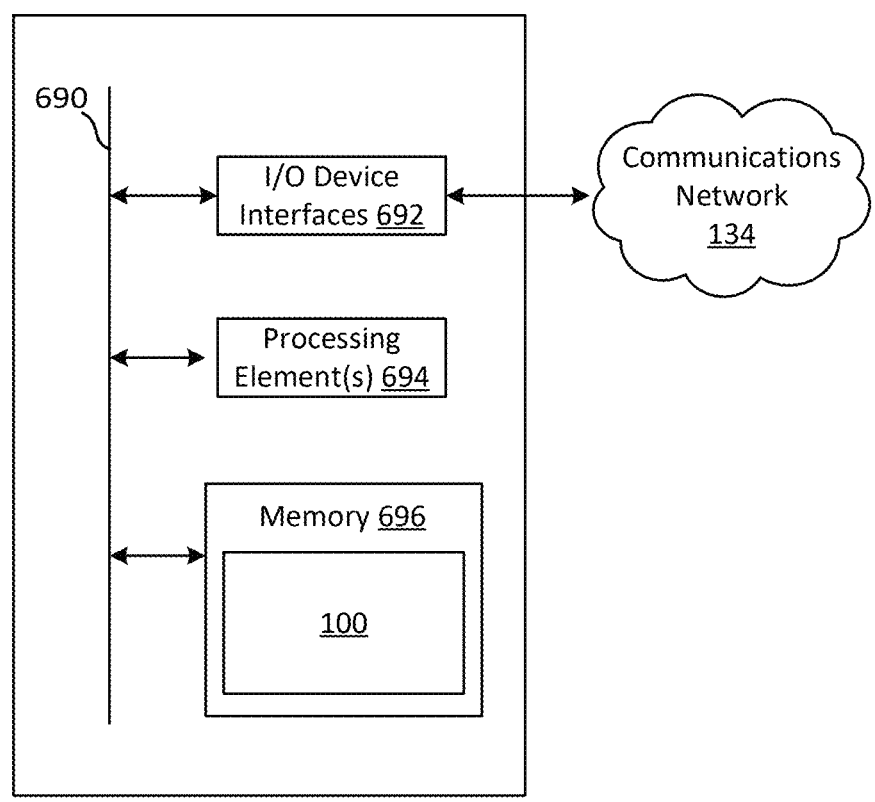
FIG. 6 is a block diagram showing an example architecture of a computing device that may be used in accordance with various embodiments described herein.

FIG. 6 is a block diagram conceptually illustrating example components of a remote device, such as a computing device executing a particular skill, a computing device executing one or more components of a feedback-based multimodal fragment retrieval system (e.g., ASR processing components, NLU processing components, applicable protocol recognition, etc.) and/or command processing. For example, the various components of FIG. 6 may be used to implement the feedback-based multimodal fragment retrieval system 100. Multiple computing devices may be included in the system, such as one computing device to implement one or more of the LM agent 114, search orchestrator 116, post-processor 124, and/or the like. In operation, each of these devices (or groups of devices) may include non-transitory computer-readable and computer-executable instructions that reside on the respective device, as will be discussed further below. The remote device of FIG. 6 may communicate with one or more other devices over a network (e.g., communications network 134).

Each computing device of a feedback-based multimodal fragment retrieval system 100 may include one or more controllers/processors 694, which may each include at least one central processing unit (CPU) for processing data and computer-readable instructions, and a memory 696 for storing data and instructions of the respective device. In some examples, memory 696 may store machine learning models and/or executable program code related to the operation of the LM agent 114, search orchestrator 116, post-processor 124, and/or the like, when loaded from memory 696. In various further examples, memory 696 may be effective to store instructions effective to program controllers/processors 694 to perform the various techniques described above in reference to FIGS. 1, 2A-2C, and/or 3-4. Accordingly, in FIG. 6, the feedback-based multimodal fragment retrieval system 100 is depicted as being stored within memory 696, as an example. The memory 696 may individually include volatile random access memory (RAM), non-volatile read only memory (ROM), non-volatile magneto resistive memory (MRAM), and/or other types of memory. Each computing device of a multimodal fragment retrieval system (and/or a component thereof) may also include memory 696 for storing data and controller/processor-executable instructions. Each memory 696 may individually include one or more non-volatile storage types such as magnetic storage, optical storage, solid-state storage, etc. Each computing device of a multimodal fragment retrieval system may also be connected to removable or external non-volatile memory and/or storage (such as a removable memory card, memory key drive, networked storage, etc.) through respective input/output device interfaces 692. In various examples, the feature data and/or training data used by the various machine learning models may be stored and/or cached in memory 696.

Computer instructions for operating each component of the feedback-based multimodal fragment retrieval system 100 depicted in FIG. 1 may be executed by the respective device's controllers/processors 694, using the memory 696 as temporary "working" storage at runtime. A device's computer instructions may be stored in a non-transitory manner in non-volatile memory 696 (e.g., a non-transitory computer-readable memory), memory 696, or an external device(s). Alternatively, some or all of the executable instructions may be embedded in hardware or firmware on the respective device in addition to or instead of software. Each computing device of the various computing devices described herein may include input/output device interfaces 692. A variety of components may be connected through the input/output device interfaces 692, as will be discussed further below. Additionally, each computing device of a multimodal fragment retrieval system may include an address/data bus 690 for conveying data among components of the respective device. Each component within a computing device of a feedback-based multimodal fragment retrieval system may also be directly connected to other components in addition to (or instead of) being connected to other components across the bus 690. As noted above, multiple devices may be employed in a single system. In such a multi-device system, each of the devices may include different components for performing different aspects of the system's processing. The multiple devices may include overlapping components. The components of a multimodal fragment retrieval system, as described herein, are exemplary, and may be located as a stand-alone device or may be included, in whole or in part, as a component of a larger device or system.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some examples, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described examples of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:
  receiving first user input data comprising a first user search query from a first user device associated with a first user, wherein the first user input data is associated with a multimodal search context, wherein the multimodal search context is associated with one or more of a device type, device attributes, or geolocation data associated with the first user device;
  receiving, by a language model (LM) agent, the first user search query;
  determining, by the LM agent and based at least in part on the first user search query, a first set of search parameters, wherein determining the first set of search parameters comprises executing one or more of a memory retention plan or an exploration plan with respect to a feedback memory datastore, wherein the first set of search parameters is determined based at least in part on a first feedback state characterizing a first qualitative reaction of the first user to a first set of previously retrieved multimodal search results related to a first previous user search query stored in the feedback memory datastore, wherein the first feedback state is generated based at least in part on a first set of feedback signals received from the first user device in response to the first set of previously retrieved multimodal search results;
  determining, by the LM agent and based at least in part on the first user search query, first trend data based at least in part on analysis of a set of contextual fragment data stored in a fragment signals datastore;
  determining, by the LM agent, a second set of search parameters using the first trend data;
  generating, by the LM agent and based at least in part on the first set of search parameters and the second set of search parameters, a search execution plan;
  retrieving, based at least in part on executing the search execution plan with respect to a set of candidate retrieval sources, a first set of relevant multimodal search results, wherein one or more relevant multimodal search results of the first set of relevant multimodal search results are retrieved according to a set of predetermined constraints;
  generating, based at least in part on the first set of relevant multimodal search results, a first multimodal search result object, wherein the first multimodal search result object comprises at least a subset of the first set of relevant multimodal search results, and wherein the subset of the first set of relevant multimodal search results is determined based in part on the multimodal search context;

providing the first multimodal search result object to at least a first user device associated with the first user;

receiving, from the first user device, a second set of feedback signals associated with the first user, wherein the second set of feedback signals is generated in response receiving the first multimodal search result object; and storing one or more of the first user input data, the first set of search parameters, the second set of search parameters, the search execution plan, the first multimodal search result object, or the second set of feedback signals in the feedback memory datastore.

2. The computer-implemented method of claim 1, wherein executing the memory retention plan comprises:

determining, based at least in part on a first query formulation associated with the first user search query, a preferred multimodal fragment sequence of the first user, and generating the first multimodal search result object based at least in part on the preferred multimodal fragment sequence.

3. The computer-implemented method of claim 1, wherein executing the memory retention plan comprises:

determining, based at least in part on a first query formulation associated with the first user search query, a preferred multimodal fragment modality type of the first user, and generating the first multimodal search result object based at least in part on the preferred multimodal fragment modality type.

4. A computer-implemented method comprising:

receiving first user input data comprising a first user search query from a first user device associated with a first user;

receiving, by a language model (LM) agent, the first user search query;

determining, by the LM agent and based at least in part on the first user search query, a first set of search parameters, wherein the first set of search parameters is determined based at least in part on a first feedback state characterizing a first qualitative reaction of the first user to a first set of previously retrieved multimodal search results related to a first previous user search query received from the first user, wherein the first feedback state is generated based at least in part on a first set of feedback signals received from the first user device in response to the first set of previously retrieved multimodal search results;

determining, by the LM agent and based at least in part on the first user search query, first trend data based on a set of contextual fragment data;

determining, by the LM agent, a second set of search parameters using the first trend data;

generating, by the LM agent and based at least in part on the first set of search parameters and the second set of search parameters, a search execution plan;

retrieving, based at least in part on executing the search execution plan with respect to a set of candidate retrieval sources, a first set of relevant multimodal search results;

generating, based at least in part on the first set of relevant multimodal search results, a first multimodal search result object, wherein the first multimodal search result object comprises at least a subset of the first set of relevant multimodal search results; and providing the first multimodal search result object to at least a first user device associated with the first user.

5. The computer-implemented method of claim 4, further comprising:

receiving, from the first user device, a second set of feedback signals associated with the first user, wherein the second set of feedback signals is generated in response receiving the first multimodal search result object; and storing one or more of the first user input data, the first set of search parameters, the second set of search parameters, the search execution plan, the first multimodal search result object, or the second set of feedback signals in a feedback memory datastore.

6. The computer-implemented method of claim 5, wherein the set of contextual fragment data is comprised in a fragment signals datastore, wherein the set of contextual fragment data comprises a set of previous external user search queries generated by one or more external users, wherein the set of previous external user search queries are associated with one or more of trending topics, trending news items, or trending events, and wherein the set of contextual fragment data comprises a set of previously retrieved multimodal search results retrieved based at least in part on the set of previous external user search queries.

7. The computer-implemented method of claim 6, wherein the set of contextual fragment data stored in the fragment signals datastore is associated with a predetermined time window, wherein the set of previous external user search queries and the set of previously retrieved multimodal search results are associated with frequency data, and wherein the frequency data indicates a number of times one or more previous external user search queries of the set of previous external user search queries have been received during the predetermined time window and a number of times one or more previously retrieved multimodal search results of the set of previously retrieved multimodal search results have been retrieved during the predetermined time window.

8. The computer-implemented method of claim 5, wherein generating the first multimodal search result object comprises:

determining, based at least in part on a multimodal search context associated with the first user input data, user device attributes associated with the first user device utilized to generate the first user input data; and determining, based at least in part on the user device attributes, whether one or more relevant multimodal search results of the first set of relevant multimodal search results are accessible by the first user device, wherein each relevant multimodal fragment of the subset of the first set of relevant multimodal search results is accessible by the first user device.

9. The computer-implemented method of claim 8, further comprising:

classifying at least a first feedback signal of the second set of feedback signals as one of an implicit feedback signal or an explicit feedback signal; and determining a feedback weight for the first feedback signal, wherein the feedback weight indicates one of positive user feedback or negative user feedback related to the first multimodal search result object.

10. The computer-implemented method of claim 9, further comprising:
providing a feedback prompt associated with the first multimodal search result object to the first user via the first user device,
wherein classifying the first feedback signal as an explicit feedback signal comprises receiving at least a first user response to the feedback prompt, wherein the feedback weight for the first feedback signal is determined based in part on the first user response.

11. The computer-implemented method of claim 10, wherein the feedback prompt is generated based at least in part on the user device attributes associated with the first user device.

12. The computer-implemented method of claim 9, wherein
classifying the first feedback signal as an implicit feedback signal comprises determining user engagement with one or more relevant multimodal search results associated with the first multimodal search result object, wherein the feedback weight for the first feedback signal is determined based in part on the user engagement.

13. The computer-implemented method of claim 5, further comprising:
determining, based in part on the second set of feedback signals, a misinformation signal indicating misinformation associated with one or more relevant multimodal search results comprised in the first multimodal search result object; and
updating, based at least in part on the misinformation signal, one or more of the feedback memory datastore, a fragment signals datastore, or the set of candidate retrieval sources to correct or remove the misinformation associated with the one or more relevant multimodal search results comprised in the first multimodal search result object.

14. The computer-implemented method of claim 4, wherein one or more of the first set of search parameters or the second set of search parameters comprise at least semantic search data, wherein determining the first set of search parameters comprises executing one or more of a memory retention plan or an exploration plan with respect to a feedback memory datastore, and
wherein the feedback memory datastore comprises a multimodal search result feedback map associated with the memory retention plan, wherein generating the multimodal search result feedback map comprises:
mapping at least the first previous user search query to one or more of a first set of previous search parameters associated with a first previously executed search execution plan, the first set of previously retrieved multimodal search results, wherein the first set of previously retrieved multimodal search results were retrieved based at least in part on the first previously executed search execution plan, and the first feedback state.

15. The computer-implemented method of claim 14, wherein executing the memory retention plan comprises:
determining, based at least in part on a first query formulation associated with the first user search query, a preferred multimodal fragment sequence of the first user, wherein the first multimodal search result object is generated based in part on the preferred multimodal fragment sequence.

16. The computer-implemented method of claim 15, wherein executing the memory retention plan comprises:
determining, based at least in part on a first query formulation associated with the first user search query, a preferred multimodal fragment modality type of the first user, wherein the first multimodal search result object is generated based in part on the preferred multimodal fragment modality type.

17. The computer-implemented method of claim 16, wherein executing the memory retention plan comprises:
determining a subject matter associated with the first user search query, wherein one or more of the preferred multimodal fragment sequence or the preferred multimodal fragment modality type of the first multimodal search result object are generated based in part on the subject matter associated with the first user search query.

18. The computer-implemented method of claim 4, wherein at least a first relevant multimodal search result of the first set of relevant multimodal search results is a subset of data associated with a source data file.

19. A system comprising:
at least one processor; and
non-transitory computer-readable memory storing instructions that, when executed by the at least one processor, are effective to:
receive first user input data comprising a first user search query from a first user device associated with a first user;
receive, by a language model (LM) agent, the first user search query;
determine, by the LM agent and based at least in part on the first user search query, a first set of search parameters, wherein the first set of search parameters is determined based at least in part on a first feedback state characterizing a first qualitative reaction of the first user to a first set of previously retrieved multimodal search results related to a first previous user search query received from the first user, wherein the first feedback state is generated based at least in part on a first set of feedback signals received from the first user device in response to the first set of previously retrieved multimodal search results;
determine, by the LM agent and based at least in part on the first user search query, first trend data based on a set of contextual fragment data;
determine, by the LM agent, a second set of search parameters using the first trend data;
generate, by the LM agent and based at least in part on the first set of search parameters and the second set of search parameters, a search execution plan;
retrieve, based at least in part on executing the search execution plan with respect to a set of candidate retrieval sources, a first set of relevant multimodal search results;
generate based at least in part on the first set of relevant multimodal search results, a first multimodal search result object, wherein the first multimodal search result object comprises at least a subset of the first set of relevant multimodal search results; and
provide the first multimodal search result object to at least a first user device associated with the first user.

20. The system of claim 19, wherein one or more of the first set of search parameters or the second set of search parameters comprise at least semantic search data, and wherein the LM agent is configured to determine the first set of search parameters based on executing one or more of a memory retention plan or an exploration plan with respect to a feedback memory datastore, wherein the memory retention plan is effective to:
  determine, based at least in part on a first query formulation associated with the first user search query, a preferred multimodal fragment sequence of the first user, wherein the first multimodal search result object is generated based in part on the preferred multimodal fragment sequence.

\* \* \* \* \*